US009935851B2

(12) United States Patent
Gandham et al.

(10) Patent No.: US 9,935,851 B2
(45) Date of Patent: Apr. 3, 2018

(54) TECHNOLOGIES FOR DETERMINING SENSOR PLACEMENT AND TOPOLOGY

(71) Applicant: Cisco Technology, Inc., San Jose, CA (US)

(72) Inventors: Shashidhar Gandham, Fremont, CA (US); Rohit Chandra Prasad, Sunnyvale, CA (US); Ashutosh Kulshreshtha, Fremont, CA (US); Supreeth Hosur Nagesh Rao, Cupertino, CA (US); Khawar Deen, Sunnyvale, CA (US); Navindra Yadav, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 92 days.

(21) Appl. No.: 15/152,293

(22) Filed: May 11, 2016

(65) Prior Publication Data
US 2016/0359703 A1 Dec. 8, 2016

Related U.S. Application Data

(60) Provisional application No. 62/171,899, filed on Jun. 5, 2015.

(51) Int. Cl.
| *H04W 4/00* | (2009.01) |
| *H04L 12/26* | (2006.01) |
| *H04L 29/06* | (2006.01) |
| *G06F 9/455* | (2018.01) |
| *G06F 17/30* | (2006.01) |
| *H04L 12/851* | (2013.01) |
| *H04L 12/24* | (2006.01) |

(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS

| 5,742,829 A | 4/1998 | Davis et al. |
| 6,012,096 A | 1/2000 | Link et al. |
| (Continued) | | |

FOREIGN PATENT DOCUMENTS

| CN | 101093452 | 12/2007 |
| CN | 101770551 | 7/2010 |
| (Continued) | | |

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov,au/infosec/top-mitigations/top-4-strategies-explained.htm.
(Continued)

*Primary Examiner* — Anh-Vu Ly
(74) *Attorney, Agent, or Firm* — Polsinelli PC

(57) ABSTRACT

Systems, methods, and computer-readable media for determining sensor placement and topology. In some embodiments, a system can receive messages from sensors deployed around a network, each of the messages reporting a respective flow captured by a reporting sensor from the sensors. Next, the system can identify flows reported in the messages and, for each of the flows, generate a respective list of sensors that reported that flow. Based on the respective list of sensors, the system can infer a respective placement of the sensors within the network and a topology of the sensors. For example, the system can determine that a first sensor is deployed in a virtual machine, a second sensor is deployed in a hypervisor hosting the virtual machine, and a
(Continued)

third sensor is deployed in a network device configured to route traffic associated with the hypervisor.

20 Claims, 16 Drawing Sheets

(51) Int. Cl.
| | |
|---|---|
| H04W 84/18 | (2009.01) |
| H04L 29/08 | (2006.01) |
| G06N 99/00 | (2010.01) |
| G06F 21/53 | (2013.01) |
| H04L 12/723 | (2013.01) |
| G06F 3/0484 | (2013.01) |
| H04L 1/24 | (2006.01) |
| H04W 72/08 | (2009.01) |
| H04L 9/08 | (2006.01) |
| H04L 9/32 | (2006.01) |
| H04J 3/06 | (2006.01) |
| H04J 3/14 | (2006.01) |
| H04L 29/12 | (2006.01) |
| H04L 12/813 | (2013.01) |
| H04L 12/823 | (2013.01) |
| H04L 12/801 | (2013.01) |
| H04L 12/741 | (2013.01) |
| H04L 12/833 | (2013.01) |
| H04L 12/721 | (2013.01) |
| G06F 3/0482 | (2013.01) |
| G06T 11/20 | (2006.01) |
| H04L 12/841 | (2013.01) |
| H04L 12/725 | (2013.01) |
| H04L 12/715 | (2013.01) |

(52) U.S. Cl.
CPC ...... *G06F 3/04847* (2013.01); *G06F 9/45558* (2013.01); *G06F 17/3053* (2013.01); *G06F 17/30241* (2013.01); *G06F 17/30554* (2013.01); *G06F 17/30598* (2013.01); *G06F 17/30604* (2013.01); *G06F 17/30867* (2013.01); *G06F 21/53* (2013.01); *G06N 99/005* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *H04L 67/22* (2013.01)

(56) References Cited

U.S. PATENT DOCUMENTS

| | | |
|---|---|---|
| 6,144,962 A | 11/2000 | Weinberg et al. |
| 6,247,058 B1 | 6/2001 | Miller et al. |
| 6,525,658 B2 | 2/2003 | Streetman et al. |
| 6,611,896 B1 | 8/2003 | Mason, Jr. et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,120,934 B2 | 10/2006 | Ishikawa |
| 7,185,103 B1 | 2/2007 | Jain |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,783,457 B2 | 8/2010 | Cunningham |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,135,657 B2 | 3/2012 | Kapoor et al. |
| 8,156,430 B2 | 4/2012 | Newman |
| 8,185,824 B1 | 5/2012 | Mitchell et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,296,847 B2 | 10/2012 | Mendonca et al. |
| 8,370,407 B1 | 2/2013 | Devarajan et al. |

(56) References Cited

U.S. PATENT DOCUMENTS

| | | |
|---|---|---|
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,442,073 B2 | 5/2013 | Skubacz et al. |
| 8,451,731 B1 | 5/2013 | Lee et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,588,081 B2 | 11/2013 | Salam et al. |
| 8,600,726 B1 | 12/2013 | Varshney et al. |
| 8,630,316 B2 | 1/2014 | Haba |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,719,835 B2 | 5/2014 | Kanso et al. |
| 8,752,042 B2 | 6/2014 | Ratica |
| 8,755,396 B2 | 6/2014 | Sindhu et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,461 B2 | 9/2014 | Saroiu et al. |
| 8,849,926 B2 | 9/2014 | Marzencki et al. |
| 8,887,238 B2 | 11/2014 | Howard et al. |
| 8,904,520 B1 | 12/2014 | Nachenberg et al. |
| 8,931,043 B2 | 1/2015 | Cooper et al. |
| 8,954,610 B2 | 2/2015 | Berke et al. |
| 8,973,147 B2 | 3/2015 | Pearcy et al. |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,110,905 B2 | 8/2015 | Polley et al. |
| 9,160,764 B2 | 10/2015 | Stiansen et al. |
| 9,178,906 B1 | 11/2015 | Chen et al. |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,319,384 B2 | 4/2016 | Yan et al. |
| 2003/0097439 A1 | 5/2003 | Strayer et al. |
| 2006/0095968 A1 | 5/2006 | Portolani et al. |
| 2006/0156408 A1 | 7/2006 | Himberger et al. |
| 2006/0274659 A1 | 12/2006 | Ouderkirk |
| 2007/0044147 A1 | 2/2007 | Choi et al. |
| 2007/0097976 A1 | 5/2007 | Wood et al. |
| 2007/0195729 A1 | 8/2007 | Li et al. |
| 2007/0300061 A1 | 12/2007 | Kim et al. |
| 2008/0082662 A1 | 4/2008 | Dandliker et al. |
| 2008/0270199 A1 | 10/2008 | Chess et al. |
| 2010/0077445 A1 | 3/2010 | Schneider et al. |
| 2010/0095293 A1 | 4/2010 | O'Neill et al. |
| 2010/0235915 A1 | 9/2010 | Memon et al. |
| 2010/0319060 A1 | 12/2010 | Aiken et al. |
| 2011/0010585 A1 | 1/2011 | Bugenhagen et al. |
| 2011/0066719 A1 | 3/2011 | Miryanov et al. |
| 2011/0069685 A1 | 3/2011 | Tofighbakhsh |
| 2011/0145885 A1 | 6/2011 | Rivers et al. |
| 2011/0196957 A1 | 8/2011 | Ayachitula et al. |
| 2011/0202655 A1 | 8/2011 | Sharma et al. |
| 2011/0228696 A1 | 9/2011 | Agarwal et al. |
| 2011/0302652 A1 | 12/2011 | Westerfeld |
| 2012/0102361 A1 | 4/2012 | Sass et al. |
| 2012/0117226 A1* | 5/2012 | Tanaka ............ H04L 41/0266 709/224 |
| 2012/0140626 A1 | 6/2012 | Anand et al. |
| 2012/0197856 A1 | 8/2012 | Banka et al. |
| 2012/0233473 A1 | 9/2012 | Vasseur et al. |
| 2013/0003538 A1 | 1/2013 | Greenberg et al. |
| 2013/0038358 A1 | 2/2013 | Cook et al. |
| 2013/0103827 A1 | 4/2013 | Dunlap et al. |
| 2013/0179487 A1 | 7/2013 | Lubetzky et al. |
| 2013/0247201 A1 | 9/2013 | Alperovitch et al. |
| 2013/0290521 A1 | 10/2013 | Labovitz |
| 2013/0297771 A1 | 11/2013 | Osterloh et al. |
| 2013/0305369 A1 | 11/2013 | Karta et al. |
| 2013/0318357 A1 | 11/2013 | Abraham et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0033193 A1 | 1/2014 | Palaniappan |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0089494 A1 | 3/2014 | Dasari et al. |
| 2014/0143825 A1 | 5/2014 | Behrendt et al. |
| 2014/0149490 A1 | 5/2014 | Luxenberg et al. |
| 2014/0164607 A1 | 6/2014 | Bai et al. |
| 2014/0173623 A1 | 6/2014 | Chang et al. |
| 2014/0192639 A1 | 7/2014 | Smirnov |
| 2014/0215573 A1 | 7/2014 | Cepuran |
| 2014/0215621 A1 | 7/2014 | Xaypanya et al. |
| 2014/0281030 A1 | 9/2014 | Cui et al. |
| 2014/0298461 A1 | 10/2014 | Hohndel et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0009840 A1 | 1/2015 | Pruthi et al. |
| 2015/0033305 A1 | 1/2015 | Shear et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0067143 A1 | 3/2015 | Babakhan et al. |
| 2015/0085665 A1* | 3/2015 | Kompella ............ H04L 47/2483 370/236 |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1* | 5/2015 | Agarwal ............... H04L 47/122 370/235 |
| 2015/0142962 A1 | 5/2015 | Srinivas et al. |
| 2015/0256555 A1 | 9/2015 | Choi et al. |
| 2015/0271255 A1 | 9/2015 | Mackay et al. |
| 2015/0295945 A1 | 10/2015 | Canzanese, Jr. et al. |
| 2015/0347554 A1 | 12/2015 | Vasantham et al. |
| 2015/0358352 A1 | 12/2015 | Chasin et al. |
| 2016/0021131 A1 | 1/2016 | Heilig |
| 2016/0030683 A1* | 2/2016 | Taylor ................... A61M 5/345 604/151 |
| 2016/0050132 A1* | 2/2016 | Zhang ............... H04L 29/08153 370/252 |
| 2016/0105350 A1* | 4/2016 | Greifeneder .......... H04L 41/046 709/224 |
| 2016/0127395 A1 | 5/2016 | Underwood et al. |
| 2016/0205002 A1* | 7/2016 | Rieke ................... H04L 41/142 709/224 |
| 2016/0216994 A1* | 7/2016 | Sefidcon ............. G06F 11/3495 370/389 |
| 2016/0357424 A1 | 12/2016 | Pang et al. |
| 2016/0357546 A1* | 12/2016 | Chang ...................... G06F 8/65 370/389 |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parandehgheibi et al. |

(56) References Cited

U.S. PATENT DOCUMENTS

| | | | |
|---|---|---|---|
| 2016/0359680 A1 | 12/2016 | Parandehgheibi et al. | |
| 2016/0359686 A1 | 12/2016 | Parandehgheibi et al. | |
| 2016/0359696 A1 | 12/2016 | Yadav et al. | |
| 2016/0359697 A1 | 12/2016 | Scheib et al. | |
| 2016/0359698 A1 | 12/2016 | Deen et al. | |
| 2016/0359699 A1 | 12/2016 | Gandham et al. | |
| 2016/0359700 A1* | 12/2016 | Pang | H04L 43/026 370/389 |
| 2016/0359701 A1 | 12/2016 | Pang et al. | |
| 2016/0359704 A1 | 12/2016 | Gandham et al. | |
| 2016/0359705 A1 | 12/2016 | Parandehgheibi et al. | |
| 2016/0359708 A1 | 12/2016 | Gandham et al. | |
| 2016/0359709 A1 | 12/2016 | Deen et al. | |
| 2016/0359711 A1 | 12/2016 | Deen et al. | |
| 2016/0359712 A1 | 12/2016 | Alizadeh Attar et al. | |
| 2016/0359740 A1 | 12/2016 | Parandehgheibi et al. | |
| 2016/0359759 A1 | 12/2016 | Singh et al. | |
| 2016/0359872 A1* | 12/2016 | Yadav | H04L 43/04 370/389 |
| 2016/0359877 A1 | 12/2016 | Kulshreshtha et al. | |
| 2016/0359878 A1 | 12/2016 | Prasad et al. | |
| 2016/0359879 A1 | 12/2016 | Deen et al. | |
| 2016/0359880 A1* | 12/2016 | Pang | H04L 63/1425 370/389 |
| 2016/0359881 A1* | 12/2016 | Yadav | H04L 63/1425 370/389 |
| 2016/0359888 A1 | 12/2016 | Gupta et al. | |
| 2016/0359889 A1 | 12/2016 | Yadav et al. | |
| 2016/0359890 A1 | 12/2016 | Deen et al. | |
| 2016/0359891 A1 | 12/2016 | Pang et al. | |
| 2016/0359897 A1 | 12/2016 | Yadav et al. | |
| 2016/0359912 A1* | 12/2016 | Gupta | H04L 63/1425 370/389 |
| 2016/0359913 A1 | 12/2016 | Gupta et al. | |
| 2016/0359914 A1 | 12/2016 | Deen et al. | |
| 2016/0359915 A1* | 12/2016 | Gupta | H04L 63/20 370/389 |
| 2016/0359917 A1* | 12/2016 | Rao | H04L 63/1425 370/389 |
| 2017/0034018 A1 | 2/2017 | Parandehgheibi et al. | |
| 2017/0075710 A1* | 3/2017 | Prasad | G06F 9/45558 370/389 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1383261 | 1/2004 |
| EP | 1450511 | 8/2004 |
| EP | 2045974 | 4/2008 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2016/004075 | 1/2016 |
| WO | WO 2016/019523 | 2/2016 |

OTHER PUBLICATIONS

Author Unknown, "Blacklists & Dynamic Reputation: Understanding Why the Evolving Threat Eludes Blacklists," www.dambala. com, 9 pages, Dambala, Atlanta, GA, USA, 2012.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi. com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, tiled Jan. 21, 2015, entitled "Monitoring Network Policy Compliance."
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60, 2013.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130, 2008.
Cisco Systems, "Cisco Network Analysis Modules (NAM) Tutorial," Cisco Systems, Inc., Version 3.5, 2009.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "Starmine: A Visualization System for Cyber Attacks," https://www.researchgate.net/publication/221536306, Feb. 2006, 9 pages.
InternetPerils, Inc., "Control Your Internet Business Risk," 2003-2015, https://www.internetperils.com.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news/118820/Get-to-know-your-data-center-with-CMDB.

(56) References Cited

OTHER PUBLICATIONS

Lab SKU, "VMware Hands-on Labs—HOL-SDC-1301" Version: 20140321-160709, 2013; http://docs.hol.vmware.com/HOL-2013/holsdc-1301_html—en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://ifrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908094556/http://www.neverfailgroup.com/products/it-continuity-architect.
Nilsson, Dennis K., et al., "Key Management and Secure Software Updates in Wireless Process Control Environments," in Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul., 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.

\* cited by examiner

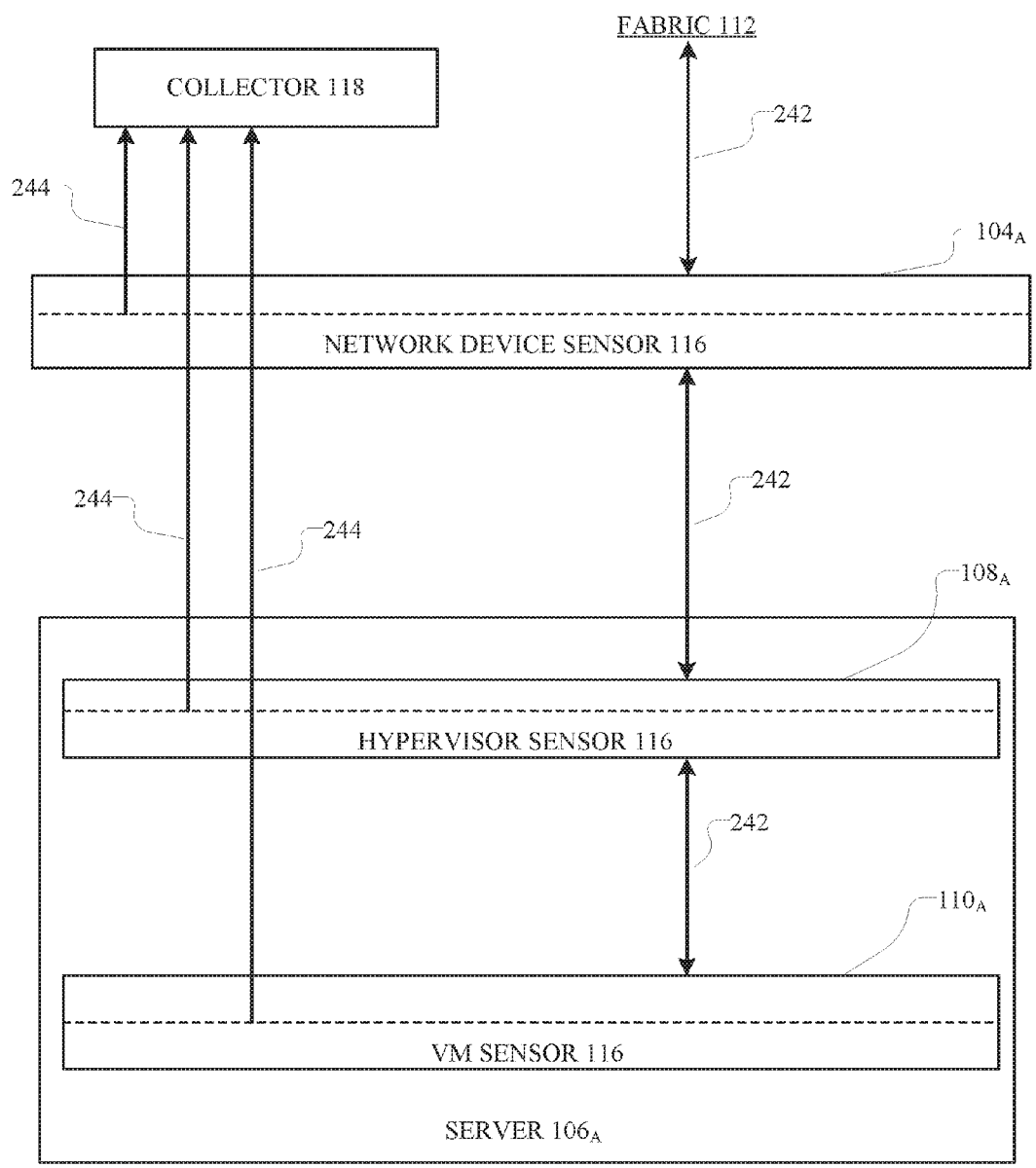

FIG. 6                    ← 600

|  | VM SENSOR 116 | HYPERVISOR SENSOR 116 | NETWORK DEVICE SENSOR 116 |
|---|---|---|---|
| FLOW 602 (VM 110$_A$) | Reported | Reported | Reported |
| FLOW 604 (HYPERVISOR 108$_A$) | Not Reported | Reported | Reported |
| FLOW 606 (LEAF ROUTER 104$_A$) | Not Reported | Not Reported | Reported |

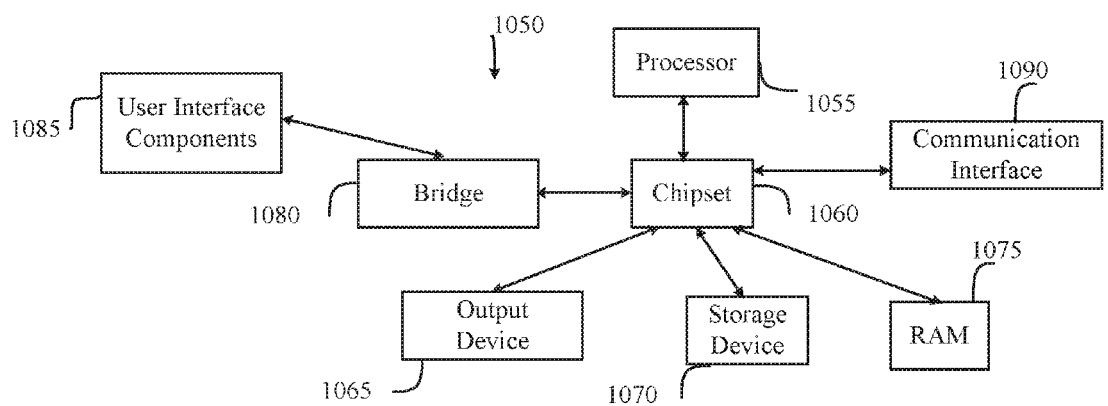
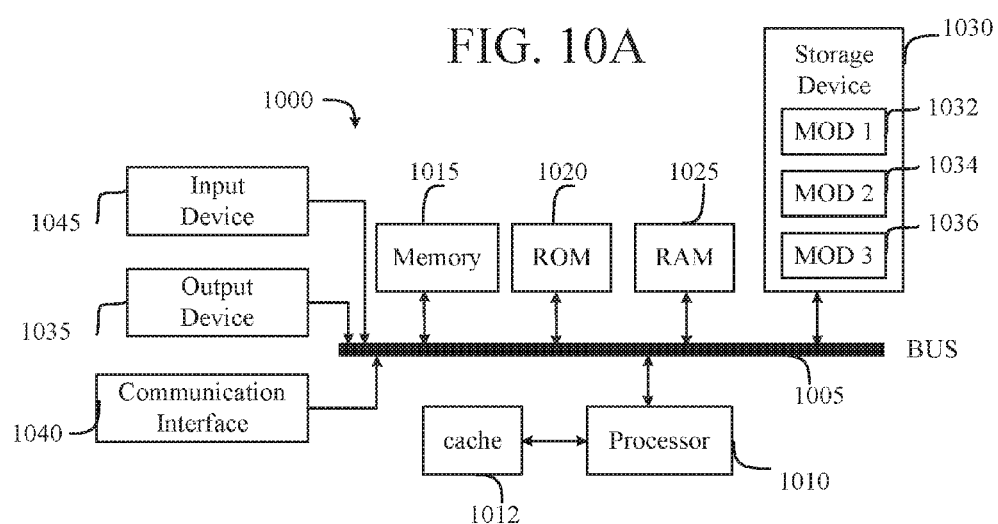

TECHNOLOGIES FOR DETERMINING SENSOR PLACEMENT AND TOPOLOGY

CROSS-REFERENCE TO RELATED APPLICATIONS

This application claims priority to U.S. Provisional Application No. 62/171,899, entitled "SYSTEM FOR MONITORING AND MANAGING DATACENTERS," filed on Jun. 5, 2015, which is incorporated herein by reference in its entirety.

TECHNICAL FIELD

The present technology pertains to network analytics, and more specifically to determining a respective placement and topology of sensors deployed throughout a network environment.

BACKGROUND

In a network environment, sensors can be placed at various devices or elements in the network to collect flow data and network statistics from different locations. The collected data from the sensors can be analyzed to monitor and troubleshoot the network. The data collected from the sensors can provide valuable details about the status, security, or performance of the network, as well as any network elements. Information about the sensors can also help interpret the data from the sensors, in order to infer or ascertain additional details from the collected data. For example, understanding the placement of a sensor relative to other sensors in the network can provide a context to the data reported by the sensors, which can further help identify specific patterns or conditions in the network. Unfortunately, however, the placement or topology of sensors can be extremely difficult to track, particularly in larger and more complex environments. Moreover, as the network grows and changes, the placement information can quickly become outdated.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2C illustrates a schematic diagram of an example reporting system in an example sensor topology;

FIG. 6 illustrates a table of an example mapping of flow reports to sensors;

FIGS. 10A and 10B illustrate example system embodiments.

DESCRIPTION OF EXAMPLE EMBODIMENTS

Figure 1:
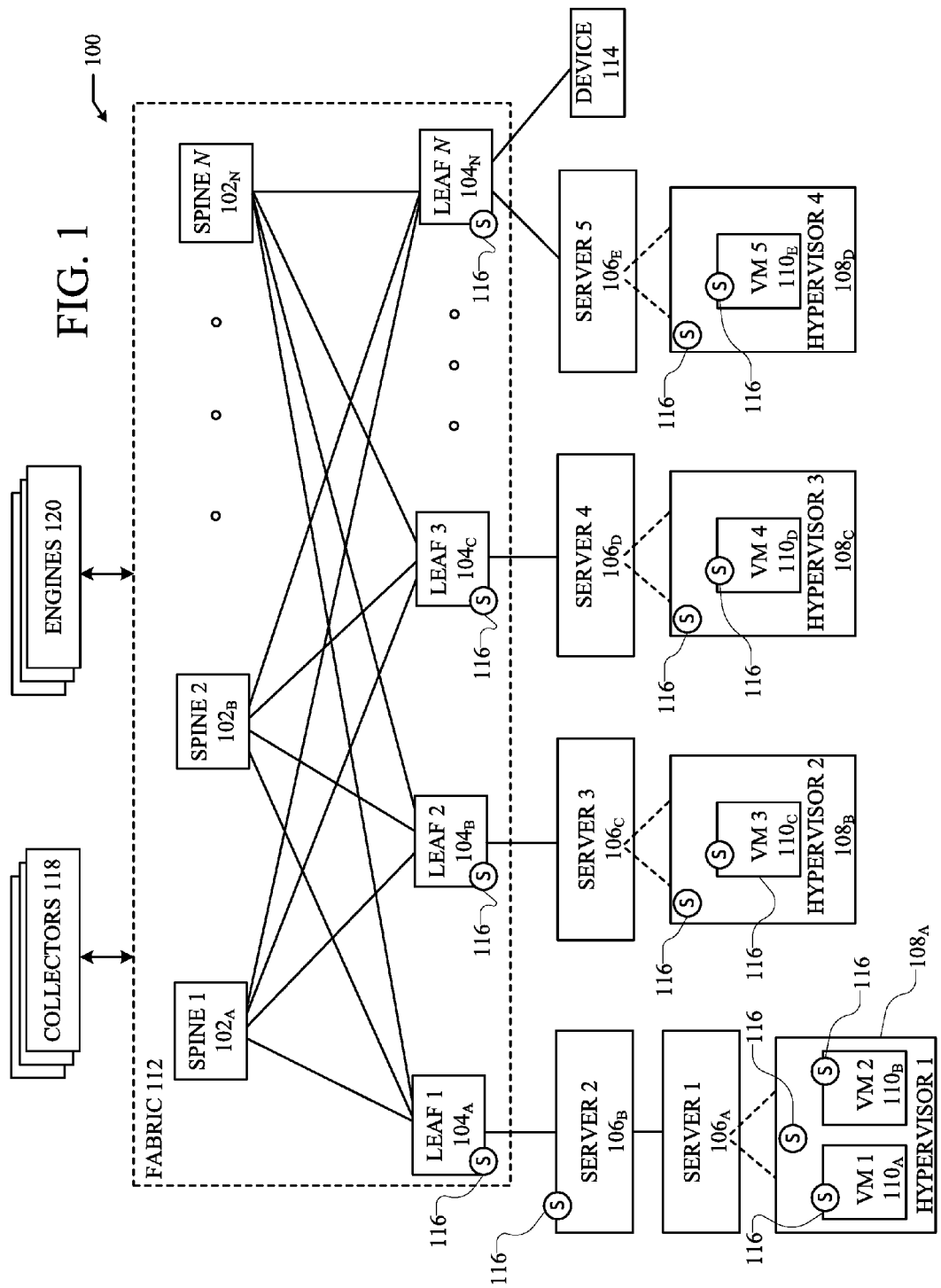
FIG. 1 illustrates a diagram of an example network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to detect the placement relationship of various sensors deployed throughout a virtualized compute environment. The sensors can be packet inspection agents configured to monitor, capture, and/or report network traffic information at the various locations. The sensors can be deployed on virtual machines, hypervisors, servers, and network devices (e.g., physical switches) on the network. The various sensors can capture traffic from their respective locations (e.g., traffic processed by their hosts), and report captured data to one or more devices, such as a collector system or a processing engine. The captured data can include any traffic and/or process information captured by the sensors.

The data reported from the various sensors can be used to infer the relative placement of the sensors throughout the network. For example, the data reported from the sensors can be used to automatically infer which sensor is running at a virtual machine, which sensor is running at a hypervisor hosting the virtual machine, and which sensor is running on a network device configured to route traffic associated with the hypervisor or virtual machine. The placement information can then be used to understand the relationships of the sensors and reported data, and may drive further analytics on the network.

Disclosed are systems, methods, and computer-readable storage media for determining sensor placement in a network. A system, such as a collector, can receive messages from sensors deployed around a network. Each of the messages can report a respective flow captured by a specific sensor. A flow can include one or more packets, messages, network metadata (e.g., communications information, handshake information, flow statistics, network messaging, etc.). A flow can also include other information, such as process information, operating system user name, timestamps, system information, system environment, addressing information, and/or any other network or system data or metadata.

Each message can also include a sensor identifier that uniquely identifies the sensor associated with the message and/or the flow. For example, a message can include a sensor identifier which can be mapped to a reported flow in order to indicate which sensor reported the flow. A message can also include a flow identifier to identify a flow in the message. Moreover, a message can also include other data and statistics, such as process information, timing information, user information, network information, system information, communications information, etc.

The system can identify flows reported in the messages. For example, the system can identify each flow in each message based on, for example, a respective flow identifier and/or specific details or metadata of the flow. Moreover, for each of the flows, the system can generate a respective list of sensors that reported that flow. For example, the system can map each flow with every sensor identifier associated or reported with that flow.

Based on the respective list of sensors, the system can infer a respective placement of the sensors within the network and/or topology of the sensors. For example, the system can determine that a first sensor is deployed in a virtual machine, a second sensor is deployed in a hypervisor hosting the virtual machine, and a third sensor is deployed in a network device configured to route traffic associated with the hypervisor.

The sensors can be configured to report each flow or communication observed by the sensor. The system can thus receive reports for each flow captured by the sensors and determine relative placement and/or topology of sensors based on which sensors reported which flows. The system can identify patterns and relationships from the reports of flows by the sensors. The system can infer that multiple sensors are deployed at different hops within a path based on one or more flows reported by those sensors. For example, the system can determine from reported flows that sensor A can observe traffic from sensor B, and sensor C can observe traffic from sensor A and sensor B. Based on this information, the system can determine that sensors A, B, and C are part of a same path. The system can also infer that sensor C is deployed at an ingress/egress point in the path, sensor B is configured to flow traffic to sensor C, and sensor B is configured to handle sensor A's traffic.

Description

Figure 2A:
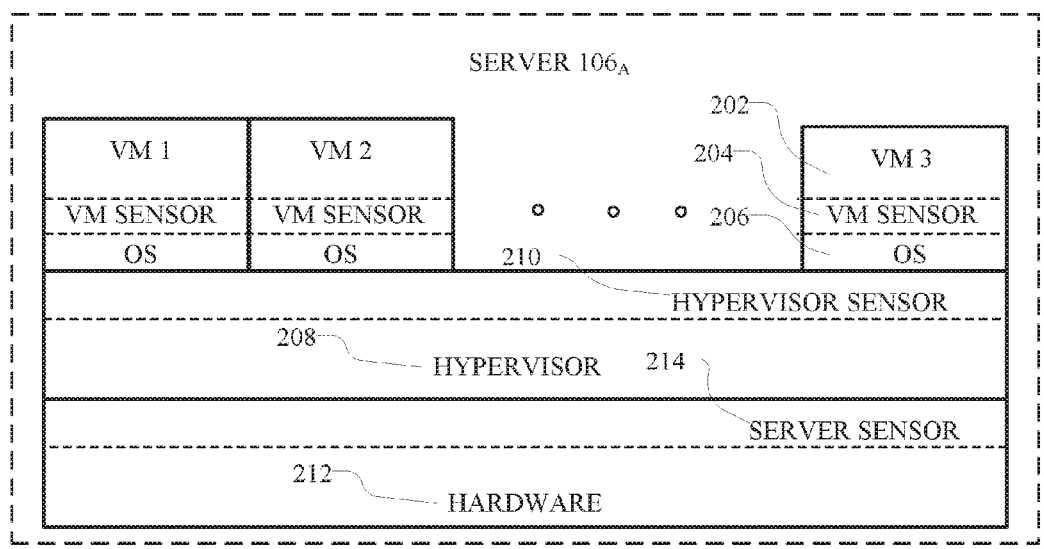
FIG. 2A illustrates a schematic diagram of an example sensor deployment in a virtualized environment.
Figure 2B:
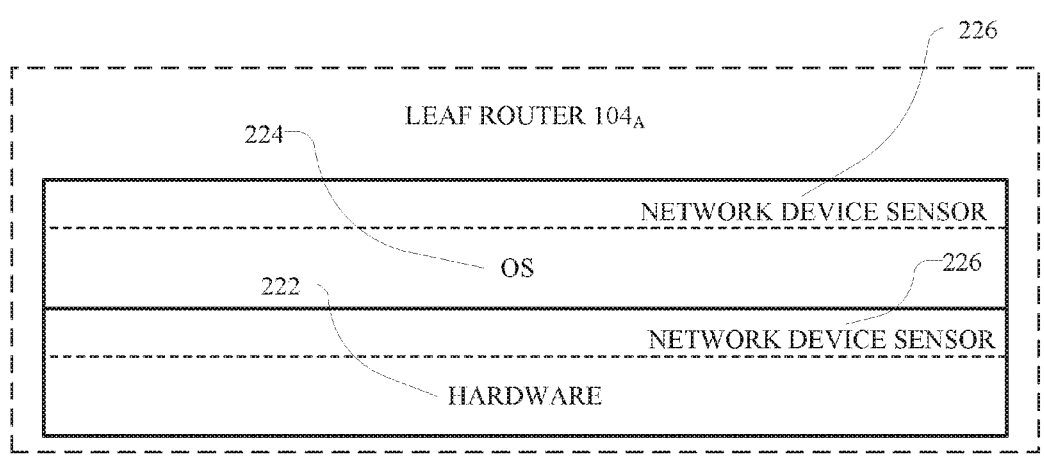
FIG. 2B illustrates a schematic diagram of an example sensor deployment in an example network device.

The disclosed technology addresses the need in the art for understanding data reported from sensors on a virtualized network. Disclosed are systems, methods, and computer-readable storage media for determining relative placement and topology of sensors deployed throughout a network. A description of an example network environment, as illustrated in FIG. 1, is first disclosed herein. A discussion of sensors and sensor topologies in virtualized environments, as illustrated in FIGS. 2A-C, will then follow. The discussion follows with a discussion of mechanisms for determining relative placement and topology information for sensors in a network environment, as illustrated in FIGS. 3-8. The discussion then concludes with a description of example devices, as illustrated in FIGS. 9 and 10A-B. These variations shall be described herein as the various embodiments are set forth. The disclosure now turns to FIG. 1.

FIG. 1 illustrates a diagram of example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edge. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-5 ($106_{A-E}$) (collectively "106"), hypervisors 1-4 ($108_A$-$108_D$) (collectively "108"), and virtual machines (VMs) 1-5 ($110_A$-$110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, a collector 118 (further described below), an engine 120 (further described below), etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106_C$ and hypervisor $108_B$. Servers 106 can similarly be migrated to other locations in network environment 100. For example, a server connected to a specific leaf router can be changed to connect to a different or additional leaf router. In some cases, some or all of the servers 106, hypervisors 108, and/or VMs 110 can represent tenant space. Tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include a sensor 116 configured to capture network data, and report any portion of the captured data to collector 118. Sensors 116 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 118.

For example, a VM sensor can run as a process, kernel module, or kernel driver on the guest operating system installed in a VM and configured to capture data (e.g., network and/or system data) processed (e.g., sent, received, generated, etc.) by the VM. A hypervisor sensor can run as a process, kernel module, or kernel driver on the host operating system installed at the hypervisor layer and configured to capture data (e.g., network and/or system data) processed (e.g., sent, received, generated, etc.) by the hypervisor. A server sensor can run as a process, kernel module, or kernel driver on the host operating system of a server and configured to capture data (e.g., network and/or system data) processed (e.g., sent, received, generated, etc.) by the server. And a network device sensor can run as a process or component in a network device, such as leaf routers 104, and configured to capture data (e.g., network and/or system data) processed (e.g., sent, received, generated, etc.) by the network device.

Sensors 116 can be configured to report data and/or metadata about one or more packets, flows, communications, processes, events, and/or activities observed to collector 118. For example, sensors 116 can capture network data as well as information about the system or host of the sensors 116 (e.g., where the sensors 116 are deployed). Such information can also include, for example, data or metadata of active or previously active processes of the system, metadata of files on the system, system alerts, networking information, etc. Reported data from sensors 116 can provide details or statistics particular to one or more tenants. For example, reported data from a subset of sensors 116 deployed throughout devices or elements in a tenant space can provide information about the performance, use, quality, events, processes, security status, characteristics, statistics, patterns, conditions, configurations, topology, and/or any other information for the particular tenant space.

Collectors 118 can be one or more devices, modules, workloads and/or processes capable of receiving data from sensors 116. Collectors 118 can thus collect reports and data from sensors 116. Collectors 118 can be deployed anywhere in network environment 100 and/or even on remote networks capable of communicating with network environment 100. For example, one or more collectors can be deployed within fabric 112 or on one or more of the servers 106. One or more collectors can be deployed outside of fabric 112 but connected to one or more leaf routers 104. Collectors 118 can be part of servers 106 and/or separate servers or devices (e.g., device 114). Collectors 118 can also be implemented in a cluster of servers.

Collectors 118 can be configured to collect data from sensors 116. In addition, collectors 118 can be implemented in one or more servers. As previously noted, collectors 118 can include one or more collectors. Moreover, each collector can be configured to receive reported data from all sensors 116 or a subset of sensors 116. For example, a collector can be assigned to a subset of sensors 116 so the data received by that specific collector is limited to data from the subset of sensors.

Collectors 118 can be configured to aggregate data from all sensors 116 and/or a subset of sensors 116. Moreover, collectors 118 can be configured to analyze some or all of the data reported by sensors 116. For example, collectors 118 can include analytics engines (e.g., engines 120) for analyzing collected data. Environment 100 can also include separate analytics engines 120 configured to analyze the data reported to collectors 118. For example, engines 120 can be configured to receive collected data from collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or perform other analytics functions.

While collectors 118 and engines 120 are shown as separate entities, this is for illustration purposes as other configurations are also contemplated herein. For example, any of collectors 118 and engines 120 can be part of a same or separate entity. Moreover, any of the collector, aggregation, and analytics functions can be implemented by one entity (e.g., collectors 118) or separately implemented by multiple entities (e.g., engine 120 and/or collectors 118).

Each of the sensors 116 can use a respective address (e.g., internet protocol (IP) address, port number, etc.) of their host to send information to collectors 118 and/or any other destination. Moreover, sensors 116 can periodically send information about flows they observe to collectors 118. Sensors 116 can be configured to report each and every flow they observe. Sensors 116 can report a list of flows that were active during a period of time (e.g., between the current time and the time of the last report). The communication channel between a sensor and collector 118 can also create a flow in every reporting interval. Thus, the information transmitted or reported by sensors 116 can also include information about the flow created by the communication channel.

FIG. 2A illustrates a schematic diagram of an example sensor deployment 200 in a virtualized environment. Server $106_A$ can run and host one or more VMs 202. VMs 202 can be configured to run workloads (e.g., applications, services, processes, functions, etc.) based on hardware resources 212 on server $106_A$. VMs 202 can run on guest operating systems 206 on a virtual operating platform provided by hypervisor 208. Each VM can run a respective guest operating system which can be the same or different as other guest operating systems associated with other VMs on server $106_A$. Moreover, each VM can have one or more network addresses, such as an internet protocol (IP) address. VMs 202 can thus communicate with hypervisor 208, server $106_A$, and/or any remote devices or networks using the one or more network addresses.

Hypervisor 208 can be a layer of software, firmware, and/or hardware that creates and runs VMs 202. The guest operating systems running on VMs 202 can share virtualized hardware resources created by hypervisor 208. The virtualized hardware resources can provide the illusion of separate hardware components. Moreover, the virtualized hardware resources can perform as physical hardware components (e.g., memory, storage, processor, network interface, etc.), and can be driven by hardware resources 212 on server $106_A$. Hypervisor 208 can have one or more network addresses, such as an internet protocol (IP) address, to communicate with other devices, components, or networks. For example, hypervisor 208 can have a dedicated IP address which it can use to communicate with VMs 202, server $106_A$, and/or any remote devices or networks.

Hardware resources 212 of server $106_A$ can provide the underlying physical hardware driving operations and functionalities provided by server $106_A$, hypervisor 208, and VMs 202. Hardware resources 212 can include, for example, one or more memory resources, one or more storage resources, one or more communication interfaces, one or more processors, one or more circuit boards, one or more extension cards, one or more power supplies, one or more antennas, one or more peripheral components, etc. Additional examples of hardware resources are described below with reference to FIGS. 9 and 10.

Server 106$_A$ can also include one or more host operating systems (not shown). The number of host operating system can vary by configuration. For example, some configurations can include a dual boot configuration that allows server 106$_A$ to boot into one of multiple host operating systems. In other configurations, server 106$_A$ may run a single host operating system. Host operating systems can run on hardware resources 212. In some cases, hypervisor 208 can run on, or utilize, a host operating system on server 106$_A$.

Server 106$_A$ can also have one or more network addresses, such as an internet protocol (IP) address, to communicate with other devices, components, or networks. For example, server 106$_A$ can have an IP address assigned to a communications interface from hardware resources 212, which it can use to communicate with VMs 202, hypervisor 208, leaf router 104$_A$ in FIG. 1, collectors 118 in FIG. 1, and/or any remote devices or networks.

VM sensors 204 can be deployed on one or more of the VMs 202. VM sensors 204 can be data and packet inspection agents deployed on the VMs 202 to capture packets, flows, processes, events, traffic, and/or any data flowing through the VMs 202. VM sensors 204 can be configured to export or report any data collected or captured by the sensors 204 to a remote entity, such as collectors 118, for example. VM sensors 204 can communicate or report such data using a network address of the respective VMs 202 (e.g., VM IP address).

VM sensors 204 can capture and report any traffic (e.g., packets, flows, etc.) sent, received, generated, and/or processed by VMs 202. For example, sensors 204 can report every packet or flow of communication sent and received by VMs 202. Moreover, any communication sent or received by VMs 202, including data reported from sensors 204, can create a network flow. VM sensors 204 can report such flows to a remote device, such as collectors 118 illustrated in FIG. 1. VM sensors 204 can report each flow separately or aggregated with other flows. When reporting a flow, VM sensors 204 can include a sensor identifier that identifies sensors 204 as reporting the associated flow. VM sensors 204 can also include a flow identifier, an IP address, a timestamp, metadata, a process ID, and any other information, as further described below.

VM sensors 204 can also report multiple flows as a set of flows. When reporting a set of flows, VM sensors 204 can include a flow identifier for the set of flows and/or a flow identifier for each flow in the set of flows. VM sensors 204 can also include one or more timestamps and other information as previously explained.

VM sensors 204 can run as a process, kernel module, or kernel driver on the guest operating systems 206 of VMs 202. VM sensors 204 can thus monitor any traffic sent and received by VMs 202, any processes running on the guest operating systems 206, any workloads on VMs 202, etc.

Hypervisor sensor 210 can be deployed on hypervisor 208. Hypervisor sensor 210 can be a data inspection agent deployed on hypervisor 208 to capture traffic (e.g., packets, flows, etc.) and/or data flowing through hypervisor 208. Hypervisor sensor 210 can be configured to export or report any data collected or captured by hypervisor sensor 210 to a remote entity, such as collectors 118, for example. Hypervisor sensor 210 can communicate or report such data using a network address of hypervisor 208, such as an IP address of hypervisor 208.

Because hypervisor 208 can see traffic and data from VMs 202, hypervisor sensor 210 can also capture and report any data (e.g., traffic data) associated with VMs 202. For example, hypervisor sensor 210 can report every packet or flow of communication sent or received by VMs 202 and/or VM sensors 204. Moreover, any communication sent or received by hypervisor 208, including data reported from hypervisor sensor 210, can create a network flow. Hypervisor sensor 210 can report such flows to a remote device, such as collectors 118 illustrated in FIG. 1. Hypervisor sensor 210 can report each flow separately and/or in combination with other flows or data. When reporting a flow, hypervisor sensor 210 can include a sensor identifier that identifies hypervisor sensor 210 as reporting the flow. Hypervisor sensor 210 can also include a flow identifier, an IP address, a timestamp, metadata, a process ID, and any other information, as explained below.

Hypervisor sensor 210 can also report multiple flows as a set of flows. When reporting a set of flows, hypervisor sensor 210 can include a flow identifier for the set of flows and/or a flow identifier for each flow in the set of flows. Hypervisor sensor 210 can also include one or more timestamps and other information as previously explained.

As previously explained, any communication captured or reported by VM sensors 204 can flow through hypervisor 208. Thus, hypervisor sensor 210 can observe and capture any flows or packets reported by VM sensors 204. Accordingly, hypervisor sensor 210 can also report any packets or flows reported by VM sensors 204. For example, VM sensor A on VM A captures flow 1 (F1) and reports F1 to collector 118 on FIG. 1. Hypervisor sensor 210 on hypervisor 208 can also see and capture F1, as F1 would traverse hypervisor 208 when being sent or received by VM A. Accordingly, hypervisor sensor 210 on hypervisor 208 can also report F1 to collector 118. Thus, collector 118 can receive a report of F1 from VM sensor A on VM A and another report of F1 from hypervisor sensor 210 on hypervisor 208.

When reporting F1, hypervisor sensor 210 can report F1 as a message or a separate from the message or report of F1 transmitted by VM sensor A on VM A. However, hypervisor sensor 210 can also, or otherwise, report F1 as a message or report that includes or appends the message or report of F1 transmitted by VM sensor A on VM A. In other words, hypervisor sensor 210 can report F1 as a separate message or report from VM sensor A's message or report of F1, and/or a same message or report that includes both a report of F1 by hypervisor sensor 210 and the report of F1 by VM sensor A at VM A. In this way, VM sensors 204 at VMs 202 can report packets or flows received or sent by VMs 202, and hypervisor sensor 210 at hypervisor 208 can report packets or flows received or sent by hypervisor 208, including any flows or packets received or sent by VMs 202 and/or reported by VM sensors 204.

Hypervisor sensor 210 can run as a process, kernel module, or kernel driver on the host operating system associated with hypervisor 208. Hypervisor sensor 210 can thus monitor any traffic sent and received by hypervisor 208, any processes associated with hypervisor 208, etc.

Server 106$_A$ can also have a server sensor 214 running on it. Server sensor 214 can be a data inspection agent deployed on server 106$_A$ to capture data (e.g., packets, flows, traffic data, etc.) on server 106$_A$. Server sensor 214 can be configured to export or report any data collected or captured by server sensor 214 to a remote entity, such as collector 118, for example. Server sensor 214 can communicate or report such data using a network address of server 106$_A$, such as an IP address of server 106$_A$.

Server sensor 214 can capture and report any packet or flow of communication associated with server 106$_A$. For example, sensor 216 can report every packet or flow of communication sent or received by one or more communication interfaces of server $106_A$. Moreover, any communication sent or received by server $106_A$, including data reported from sensors 204 and 210, can create a network flow. Server sensor 214 can report such flows to a remote device, such as collector 118 illustrated in FIG. 1. Server sensor 214 can report each flow separately or in combination. When reporting a flow, server sensor 214 can include a sensor identifier that identifies server sensor 214 as reporting the associated flow. Server sensor 214 can also include a flow identifier, an IP address, a timestamp, metadata, a process ID, and any other information.

Server sensor 214 can also report multiple flows as a set of flows. When reporting a set of flows, server sensor 214 can include a flow identifier for the set of flows and/or a flow identifier for each flow in the set of flows. Server sensor 214 can also include one or more timestamps and other information as previously explained.

Any communications capture or reported by sensors 204 and 210 can flow through server $106_A$. Thus, server sensor 214 can observe or capture any flows or packets reported by sensors 204 and 210. In other words, network data observed by sensors 204 and 210 inside VMs 202 and hypervisor 208 can be a subset of the data observed by server sensor 214 on server $106_A$. Accordingly, server sensor 214 can report any packets or flows reported by sensors 204 and 210. For example, sensor A on VM A captures flow 1 (F1) and reports F1 to collector 118 on FIG. 1. Sensor 210 on hypervisor 208 can also see and capture F1, as F1 would traverse hypervisor 208 when being sent or received by VM A. In addition, sensor 214 on server $106_A$ can also see and capture F1, as F1 would traverse server $106_A$ when being sent or received by VM A and hypervisor 208. Accordingly, sensor 216 can also report F1 to collector 118. Thus, collector 118 can receive a report of F1 from sensor A on VM A, sensor 210 on hypervisor 208, and sensor 214 on server $106_A$.

When reporting F1, server sensor 214 can report F1 as a message or report that is separate from any messages or reports of F1 transmitted by sensor A on VM A or sensor 210 on hypervisor 208. However, server sensor 214 can also, or otherwise, report F1 as a message or report that includes or appends the messages or reports or metadata of F1 transmitted by sensor A on VM A and sensor 210 on hypervisor 208. In other words, server sensor 214 can report F1 as a separate message or report from the messages or reports of F1 from sensor A and sensor 210, and/or a same message or report that includes a report of F1 by sensor A, sensor 210, and sensor 214. In this way, sensors 204 at VMs 202 can report packets or flows received or sent by VMs 202, sensor 210 at hypervisor 208 can report packets or flows received or sent by hypervisor 208, including any flows or packets received or sent by VMs 202 and reported by sensors 204, and sensor 214 at server $106_A$ can report packets or flows received or sent by server $106_A$, including any flows or packets received or sent by VMs 202 and reported by sensors 204, and any flows or packets received or sent by hypervisor 208 and reported by sensor 210.

Server sensor 214 can run as a process, kernel module, or kernel driver on the host operating system or a component of server $106_A$. Server sensor 214 can thus monitor any traffic sent and received by server $106_A$, any processes associated with server $106_A$, etc.

In addition to network data, sensors 204, 210, and 214 can capture additional information about the system or environment in which they reside. For example, sensors 204, 210, and 214 can capture data or metadata of active or previously active processes of their respective system or environment, metadata of files on their respective system or environment, timestamps, network addressing information, flow identifiers, sensor identifiers, etc. Moreover, sensors 204, 210, 214 are not specific to any operating system environment, hypervisor environment, network environment, or hardware environment. Thus, sensors 204, 210, and 214 can operate in any environment.

As previously explained, sensors 204, 210, and 214 can send information about the network traffic they observe. This information can be sent to one or more remote devices, such as one or more servers, collectors, engines, etc. Each sensor can be configured to send respective information using a network address, such as an IP address, and any other communication details, such as port number, to one or more destination addresses or locations. Sensors 204, 210, and 214 can send metadata about one or more flows, packets, communications, processes, events, etc.

Sensors 204, 210, and 214 can periodically report information about each flow or packet they observe. The information reported can contain a list of flows or packets that were active during a period of time (e.g., between the current time and the time at which the last information was reported). The communication channel between the sensor and the destination can create a flow in every interval. For example, the communication channel between sensor 210 and collector 118 can create a control flow. Thus, the information reported by a sensor can also contain information about this control flow. For example, the information reported by sensor 210 to collector 118 can include a list of flows or packets that were active at hypervisor 208 during a period of time, as well as information about the communication channel between sensor 210 and collector 118 used to report the information by sensor 210.

FIG. 2B illustrates a schematic diagram of an example sensor deployment 220 in an example network device. Network device is described as leaf router $104_A$. However, this is for explanation purposes. Network device can be any other network device, such as any other switch, router, etc.

In this example, leaf router $104_A$ can include network resources 222, such as memory, storage, communication, processing, input, output, and other types of resources. Leaf router $104_A$ can also include an operating system environment 224. The operating system environment 224 can include any operating system, such as a network operating system. The operating system environment 224 can include processes, functions, and applications for performing networking, routing, switching, forwarding, policy implementation, messaging, monitoring, and other types of operations.

Leaf router $104_A$ can also include sensor 226. Sensor 226 can be an agent configured to capture network data, such as flows or packets, sent and received by leaf router $104_A$. Sensor 226 can also be configured to capture other information, such as processes, statistics, alerts, status information, device information, etc. Moreover, sensor 226 can be configured to report captured data to a remote device or network, such as collector 118, for example. Sensor 226 can report information using one or more network addresses associated with leaf router $104_A$. For example, sensor 226 can be configured to report information using an IP assigned to an active communications interface on leaf router $104_A$.

Leaf router $104_A$ can be configured to route traffic to and from other devices or networks, such as server $106_A$. Accordingly, sensor 226 can also report data reported by other sensors on other devices. For example, leaf router $104_A$ can be configured to route traffic sent and received by server $106_A$ to other devices. Thus, data reported from sensors deployed on server $106_A$, such as VM and hypervisor sensors on server $106_A$, would also be observed by sensor 226 and can thus be reported by sensor 226 as data observed at leaf router $104_A$. Data reported by the VM and hypervisor sensors on server $106_A$ can therefore be a subset of the data reported by sensor 226.

Sensor 226 can run as a process or component (e.g., firmware, module, hardware device, etc.) in leaf router $104_A$. Moreover, sensor 226 can be installed on leaf router $104_A$ as a software or firmware agent. In some configurations, leaf router $104_A$ itself can act as sensor 226. Moreover, sensor 226 can run within the operating system 224 and/or separate from the operating system 224.

FIG. 2C illustrates a schematic diagram of an example reporting system 240 in an example sensor topology. Leaf router $104_A$ can route packets or traffic 242 between fabric 112 and server $106_A$, hypervisor $108_A$, and VM $110_A$. Packets or traffic 242 between VM $110_A$ and leaf router $104_A$ can flow through hypervisor $108_A$ and server $106_A$. Packets or traffic 242 between hypervisor $108_A$ and leaf router $104_A$ can flow through server $106_A$. Finally, packets or traffic 242 between server $106_A$ and leaf router $104_A$ can flow directly to leaf router $104_A$. However, in some cases, packets or traffic 242 between server $106_A$ and leaf router $104_A$ can flow through one or more intervening devices or networks, such as a switch or a firewall.

Moreover, VM sensor 116 at VM $110_A$, hypervisor sensor 116 at hypervisor $108_A$, network device sensor 116 at leaf router $104_A$, and any server sensor at server $106_A$ (e.g., sensor running on host environment of server $106_A$), can send reports 244 to collector 118 based on the packets or traffic 242 captured at each respective sensor. Reports 244 from VM sensor 116 to collector 118 can flow through VM $110_A$, hypervisor $108_A$, server $106_A$, and leaf router $104_A$. Reports 244 from hypervisor sensor 116 to collector 118 can flow through hypervisor $108_A$, server $106_A$, and leaf router $104_A$. Reports 244 from any other server sensor at server $106_A$ to collector 118 can flow through server $106_A$ and leaf router $104_A$. Finally, reports 244 from network device sensor 116 to collector 118 can flow through leaf router $104_A$.

Reports 244 can include any portion of packets or traffic 242 captured at the respective sensors. Reports 244 can also include other information, such as timestamps, process information, sensor identifiers, flow identifiers, flow statistics, notifications, logs, user information, system information, etc. Moreover, reports 244 can be transmitted to collector 118 periodically as new packets or traffic 242 are captured by a sensor. Further, each sensor can send a single report or multiple reports to collector 118. For example, each of the sensors 116 can be configured to send a report to collector 118 for every flow, packet, message, communication, or network data received, transmitted, and/or generated by its respective host (e.g., VM $110_A$, hypervisor $108_A$, server $106_A$, and leaf router $104_A$). As such, collector 118 can receive a report of a same packet from multiple sensors.

For example, a packet received by VM $110_A$ from fabric 112 can be captured and reported by VM sensor 116. Since the packet received by VM $110_A$ will also flow through leaf router $104_A$ and hypervisor $108_A$, it can also be captured and reported by hypervisor sensor 116 and network device sensor 116. Thus, for a packet received by VM $110_A$ from fabric 112, collector 118 can receive a report of the packet from VM sensor 116, hypervisor sensor 116, and network device sensor 116.

Similarly, a packet sent by VM $110_A$ to fabric 112 can be captured and reported by VM sensor 116. Since the packet sent by VM $110_A$ will also flow through leaf router $104_A$ and hypervisor $108_A$, it can also be captured and reported by hypervisor sensor 116 and network device sensor 116. Thus, for a packet sent by VM $110_A$ to fabric 112, collector 118 can receive a report of the packet from VM sensor 116, hypervisor sensor 116, and network device sensor 116.

On the other hand, a packet originating at, or destined to, hypervisor $108_A$, will can be captured and reported by hypervisor sensor 116 and network device sensor 116, but not VM sensor 116, as such packet would not flow through VM $110_A$. Moreover, a packet originating at, or destined to, leaf router $104_A$, will be captured and reported by network device sensor 116, but not VM sensor 116, hypervisor sensor 116, or any other sensor on server $106_A$, as such packet would not flow through VM $110_A$, hypervisor $108_A$, or server $106_A$.

Each of the sensors 116 can include a respective unique sensor identifier on each of the reports 244 it sends to collector 118, to allow collector 118 to determine which sensor sent the report. The reports 244 used to analyze network and/or system data and conditions for troubleshooting, security, visualization, configuration, planning, and management. Sensor identifiers in the reports 244 can also be used to determine which sensors reported what flows. This information can then be used to determine sensor placement and topology, as further described below. Sensor placement and topology information can be useful for analyzing the data in the reports 244, as well as troubleshooting, security, visualization, configuration, planning, and management.

Figure 3A:
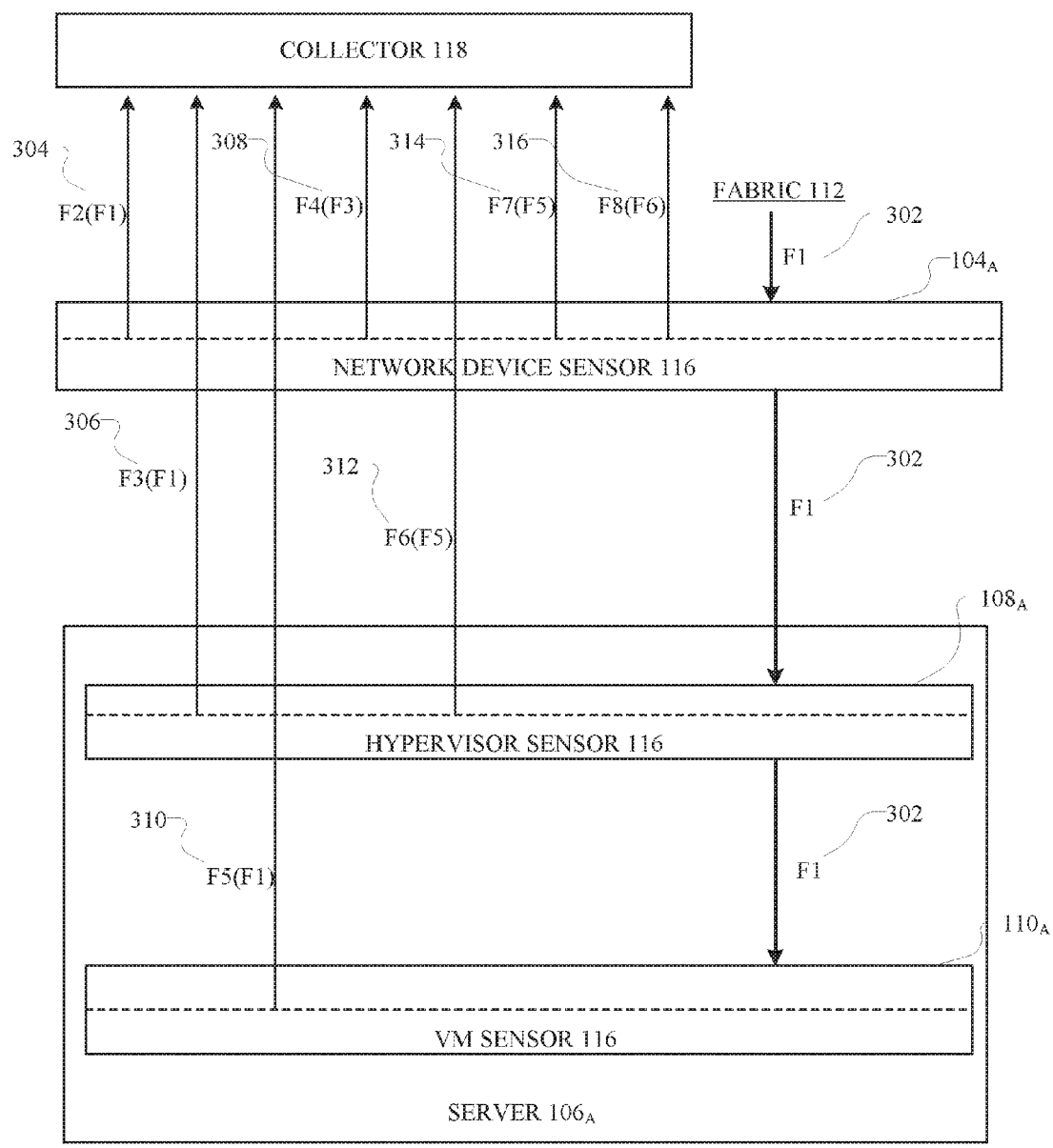
FIGS. 3A through 3F illustrate schematic diagrams of example configurations for reporting flows captured by sensors in an example sensor topology.

FIGS. 3A through 3F illustrate schematic diagrams of example configurations for reporting flows captured by sensors in an example sensor topology. Referring to FIG. 3A, leaf router $104_A$ can receive flow 302 from fabric 112. In this example, flow 302 is destined to VM $110_A$. Leaf router $104_A$ can thus forward the flow 302 received from fabric 112 to server $106_A$ and hypervisor $108_A$. Network device sensor 116 at leaf router $104_A$ can also capture the flow 302, and send a new flow 304, reporting the received flow 302, to collector 118.

Server $106_A$ and hypervisor $108_A$ can receive flow 302 from leaf router $104_A$. Hypervisor 108A can then forward the received flow 302 to VM $110_A$. Hypervisor sensor 116 can also capture the received flow 302 and send a new flow 306, reporting the received flow 302, to collector 118. Leaf router $104_A$ can receive flow 306, reporting flow 302, from hypervisor sensor 116, and forward the flow 306 to collector 118. Network device sensor 116 can also capture the flow 306 received from hypervisor sensor 116, and send a new flow 308, reporting flow 306, to collector 118.

Moreover, VM $110_A$ can receive flow 302 from hypervisor $108_A$. At this point, flow 302 has reached its intended destination: VM $110_A$. Accordingly, VM $110_A$ can then process the flow 302. Once flow 302 is received by VM $110_A$, VM sensor 116 can capture the received flow 302 and send a new flow 310, reporting the receipt of flow 302, to collector 118.

Hypervisor $108_A$ can receive flow 310 from VM sensor 116, and forward it to leaf router $104_A$. Hypervisor sensor 116 can also capture flow 310, received from VM sensor 116 and reporting the receipt of flow 302, and send a new flow 312, reporting flow 310, to collector 118.

Leaf router $104_A$ can receive flow 310 forwarded from hypervisor $108_A$, and forward it to collector 118. Network device sensor 116 can also capture flow 310, forwarded from hypervisor sensor 116 and reporting the receipt of flow 302 at VM $110_A$, and send a new flow 314, reporting flow 310, to collector 118.

Leaf router 104$_A$ can receive packet 312 from hypervisor sensor 116 and forward it to collector 118. Network device sensor 116 can also capture flow 312 and send a new flow 316, reporting flow 312, to collector 118.

As described above, in this example, flow 302 destined from fabric 112 to VM 110$_A$, can be reported by network device sensor 116, hypervisor sensor 116, and VM sensor 116 to collector 118. In addition, hypervisor sensor 116 and network device sensor 116 can each report the communication from VM 110$_A$ to collector 118, reporting flow 302 to collector 118. Network device sensor 116 can also report any communications from hypervisor sensor 116 reporting flows or communications captured by hypervisor sensor 116.

Figure 3B:
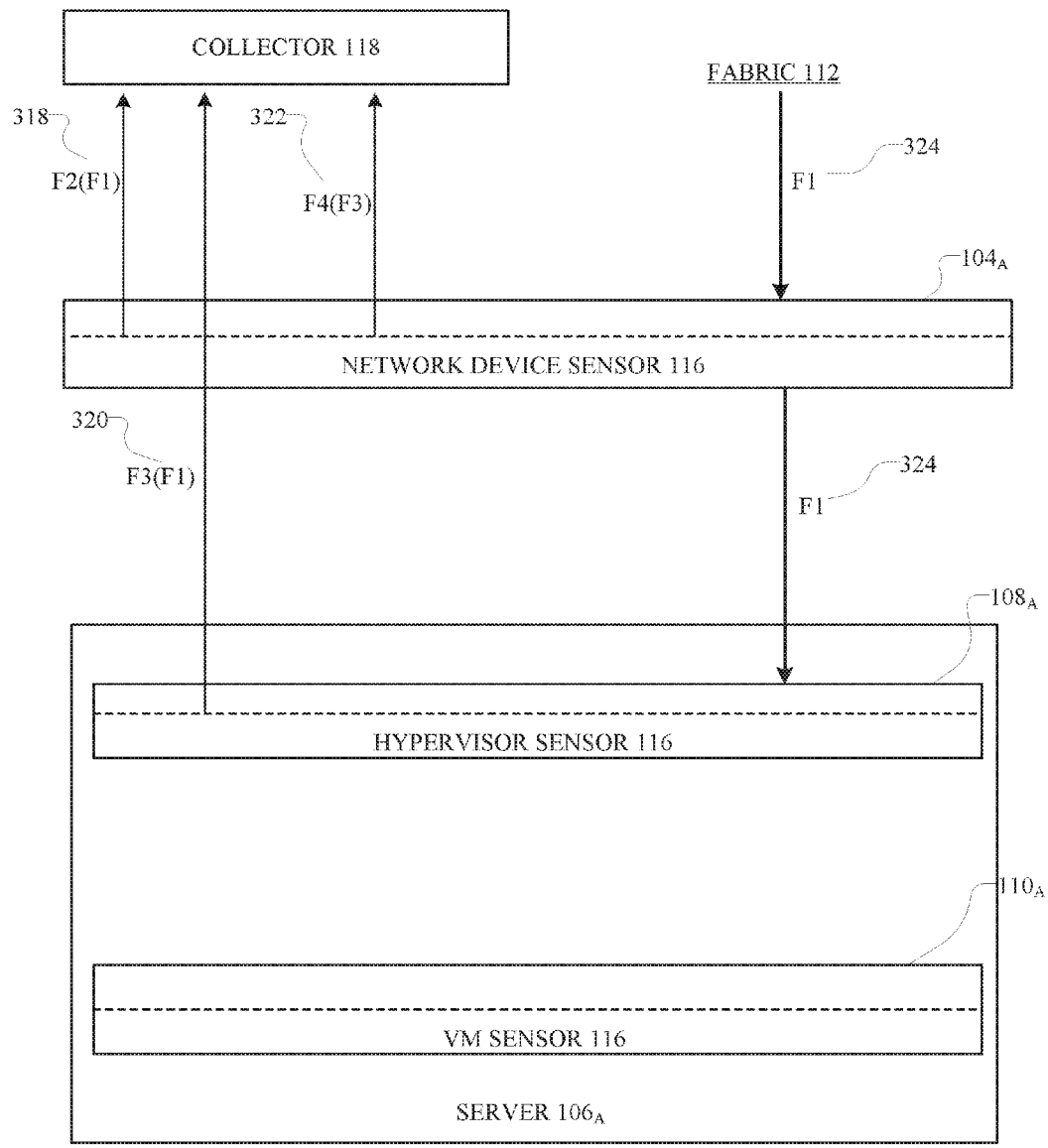

Referring to FIG. 3B, leaf router 104$_A$ can receive flow 324 from fabric 112. In this example, flow 324 is destined to hypervisor 108$_A$. Leaf router 104$_A$ can thus forward the flow 324 received from fabric 112 to server 106$_A$ and hypervisor 108$_A$. Network device sensor 116 at leaf router 104$_A$ can also capture the flow 324, and send a new flow 318, reporting the received flow 324, to collector 118.

Server 106$_A$ and hypervisor 108$_A$ can receive flow 324 from leaf router 104$_A$. Hypervisor 108A can process the received flow 324. Hypervisor sensor 116 can also capture the received flow 324 and send a new flow 320, reporting the received flow 324, to collector 118. Leaf router 104$_A$ can receive flow 320, reporting flow 324, from hypervisor sensor 116, and forward the flow 320 to collector 118. Network device sensor 116 can also capture the flow 320 received from hypervisor sensor 116, and send a new flow 322, reporting flow 3320, to collector 118.

As described above, in this example, flow 324 destined from fabric 112 to hypervisor 108$_A$, can be reported by network device sensor 116 and hypervisor sensor 116 to collector 118. In addition, network device sensor 116 can report the communication from hypervisor 108$_A$ to collector 118, reporting flow 324 to collector 118.

Figure 3C:
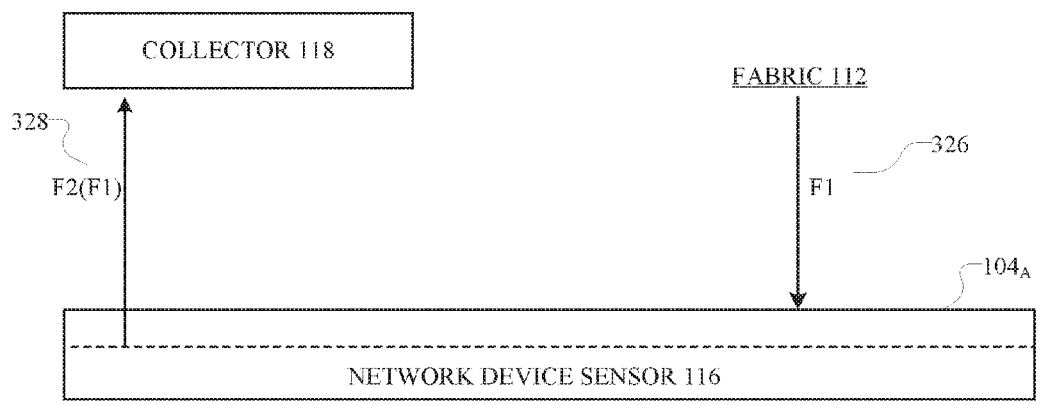

Referring to FIG. 3C, leaf router 104$_A$ can receive flow 326 from fabric 112. In this example, flow 326 is destined to leaf router 104$_A$. Thus, leaf router 104$_A$ can process flow 326, and network device sensor 116 can capture the flow 326, and send a new flow 328, reporting the received flow 326, to collector 118.

Figure 3D:
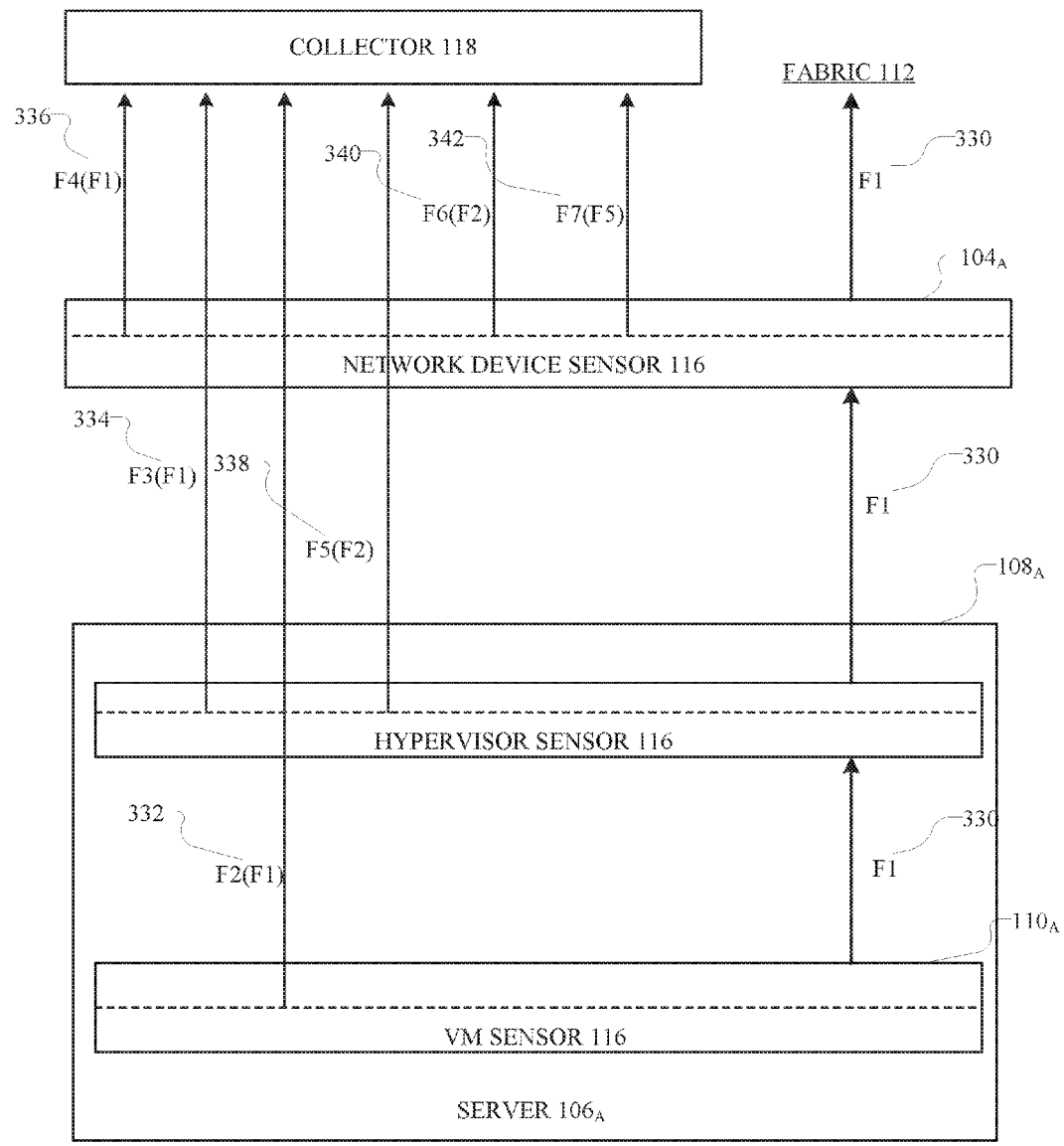

Referring to FIG. 3D, VM 110$_A$ can send flow 330 to fabric 112. Hypervisor 108$_A$ can receive flow 330 and forward it to leaf router 104$_A$. Leaf router 104$_A$ can receive flow 330 and forward it to fabric 112.

VM sensor 116 can also capture flow 330 and send a new flow 332, reporting flow 330, to collector 118. Hypervisor 116 can also capture flow 330 and send a new flow 334, reporting flow 330, to collector 118. Similarly, network device sensor 116 can capture flow 330, and send a new flow 336, reporting flow 330, to collector 118.

Hypervisor sensor 116 can also capture flow 332, reporting flow 330 by VM sensor 116, and send a new flow 338, reporting flow 332, to collector 118.

Network device sensor 116 can similarly capture flow 332, reporting flow 330 by VM sensor 116, and send a new flow 340, reporting flow 332, to collector 118. Moreover, network device sensor 116 can capture flow 338, reporting flow 332 from hypervisor sensor 116, and send a new flow 342, reporting flow 338, to collector 118.

As described above, in this example, flow 330 destined to fabric 112 from VM 110$_A$, can be reported by network device sensor 116, hypervisor sensor 116, and VM sensor 116 to collector 118. In addition, hypervisor sensor 116 and network device sensor 116 can each report the communication from VM 110$_A$ to collector 118, reporting flow 330 to collector 118. Network device sensor 116 can also report any communications from hypervisor sensor 116 reporting flows or communications captured by hypervisor sensor 116.

Figure 3E:
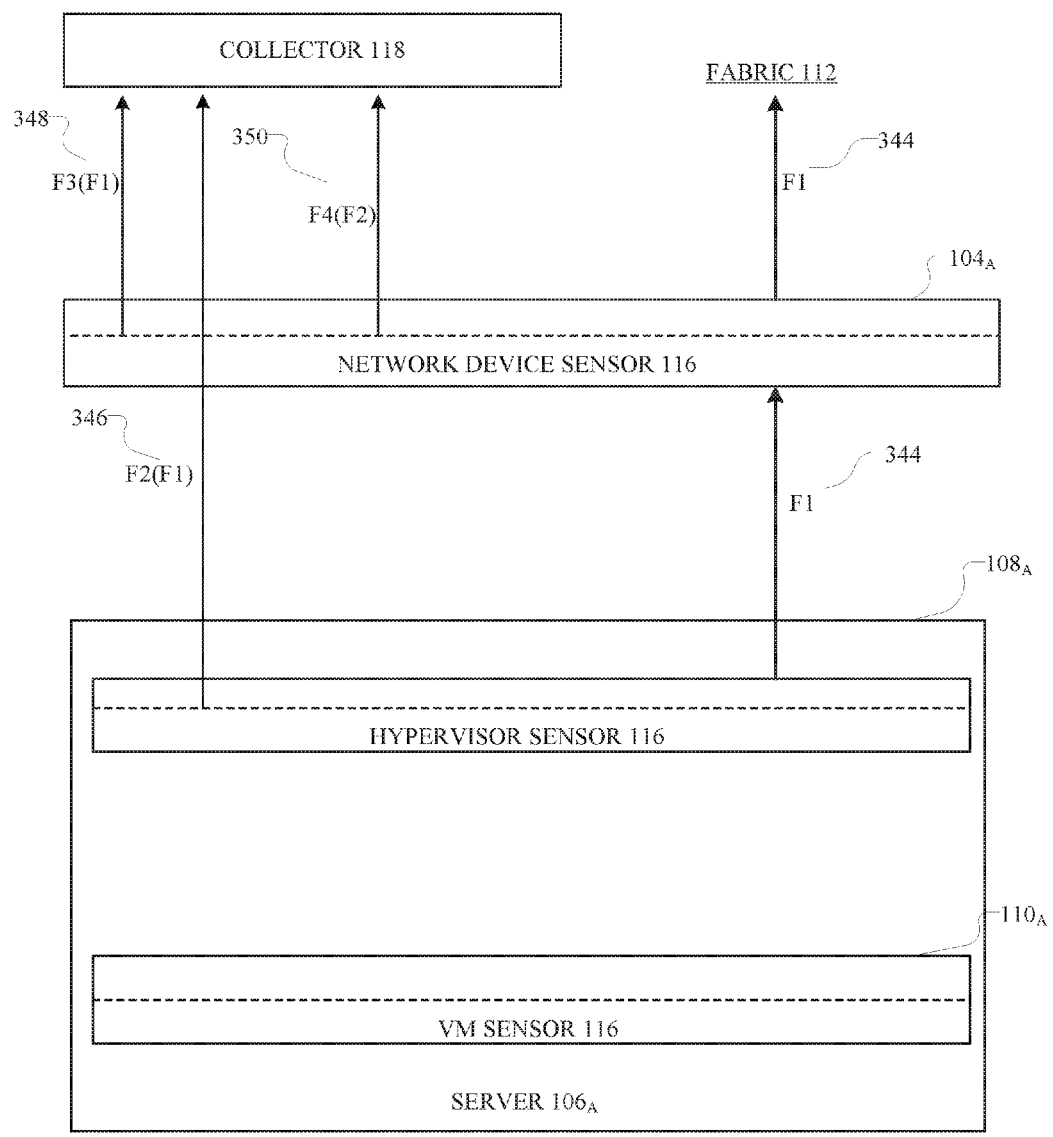

Referring to FIG. 3E, hypervisor 108$_A$ can send flow 344 to fabric 112. In this example, flow 344 is originated by hypervisor 108$_A$. Leaf router 104$_A$ can receive flow 344 and forward it to fabric 112.

Hypervisor 116 can also capture flow 344 and send a new flow 346, reporting flow 344, to collector 118. Similarly, network device sensor 116 can capture flow 344, and send a new flow 348, reporting flow 344, to collector 118.

Network device sensor 116 can also capture flow 346, reporting flow 344 by hypervisor sensor 116, and send a new flow 350, reporting flow 346, to collector 118.

Figure 3F:
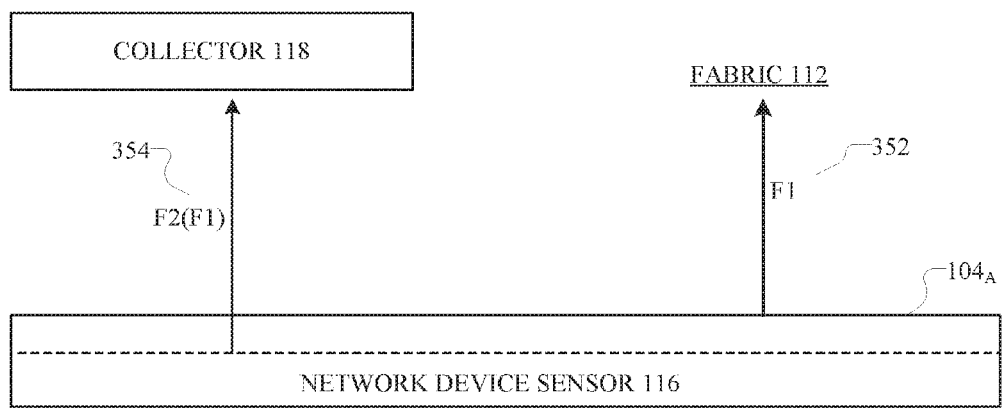

Referring to FIG. 3F, leaf router 104$_A$ can send flow 352 to fabric 112. In this example, flow 352 is originated by leaf router 104$_A$. Network device sensor 116 can capture flow 352, and send a new flow 354, reporting flow 352, to collector 118. Thus, collector 118 can receive a report of flow 352 from network device sensor 116.

Figure 4:
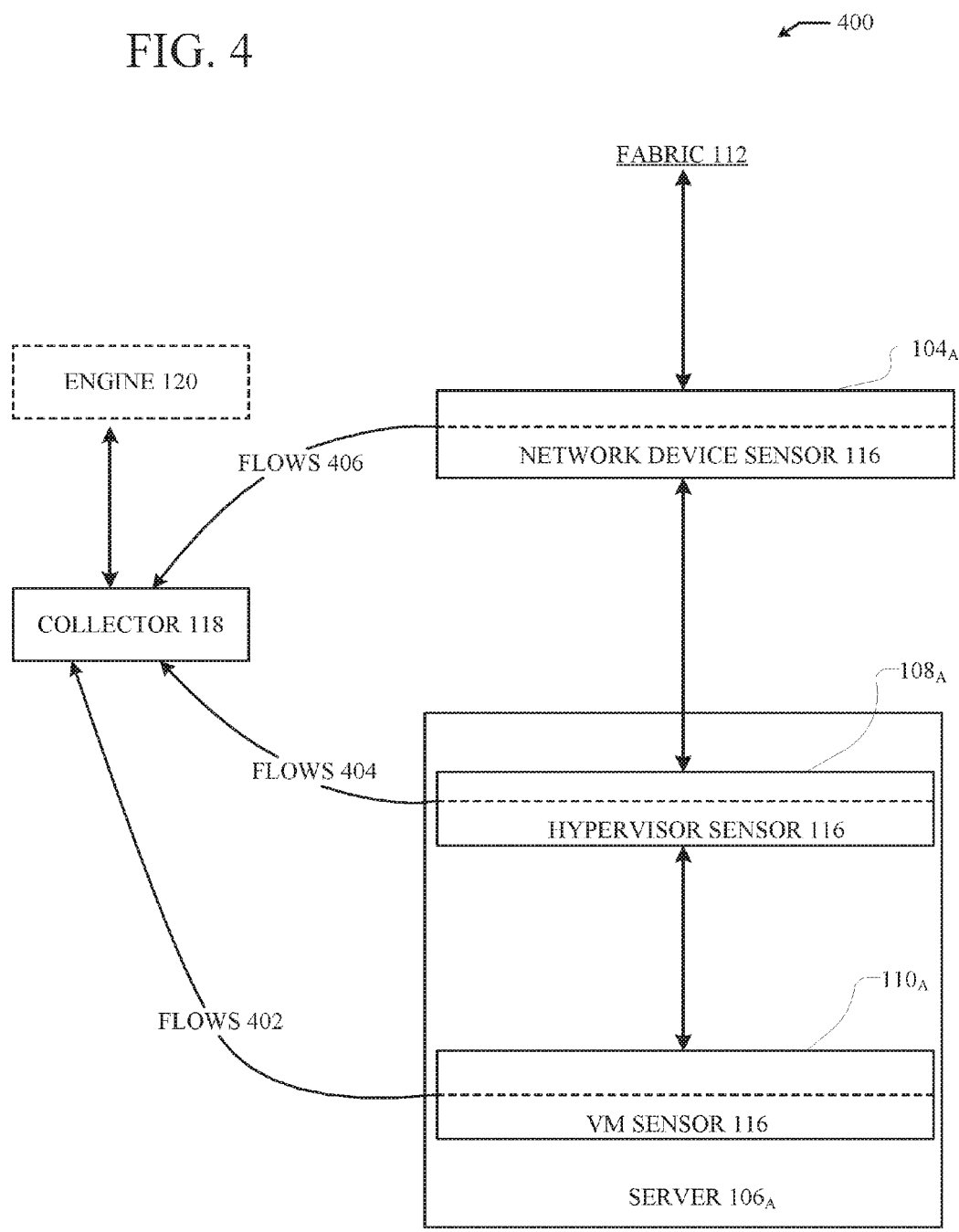
FIG. 4 illustrates a schematic diagram of an example configuration for collecting sensor reports.

FIG. 4 illustrates a schematic diagram of an example configuration 400 for collecting sensor reports. In configuration 400, traffic between fabric 112 and VM 110$_A$ is configured to flow through hypervisor 108$_A$. Moreover, traffic between fabric 112 and hypervisor 108$_A$ is configured to flow through leaf router 104$_A$.

VM sensor 116 can be configured to report to collector 118 traffic sent or received by VM 110$_A$. Hypervisor sensor 116 can be configured to report to collector 118 traffic sent and received by hypervisor 108$_A$. Finally, network device sensor 116 can be configured to report to collector 118 traffic sent and received by leaf router 104$_A$.

Collector 118 can thus receive flows 402 from VM sensor 116, flows 404 from hypervisor sensor 116, and flows 406 from network device sensor 116. Flows 402 can include flows captured by VM sensor 116 at VM 110$_A$.

Flows 404 can include flows captured by hypervisor sensor 116 at hypervisor 108$_A$. Flows captured by hypervisor sensor 116 can also include flows 402 captured by VM sensor 116, as traffic sent and received by VM 110$_A$ will be received and observed by hypervisor 108$_A$ and captured by hypervisor sensor 116.

Flows 406 can include flows captured by network device sensor 116 at leaf router 104$_A$. Flows captured by network device sensor 116 can also include flows 402 captured by VM sensor 116 and flows 404 captured by hypervisor sensor 116, as traffic sent and received by VM 110$_A$ and hypervisor 108$_A$ is routed through leaf router 104$_A$ and can thus be captured by network device sensor 116.

Collector 118 can collect flows 402, 404, and 406, and store the reported data. Collector 118 can also forward some or all of flows 402, 404, and 406, and/or any respective portion thereof, to engine 120. Engine 120 can process the information received from collector 118 to identify patterns, conditions, statuses, network or device characteristics; log statistics or history details; aggregate and/or process the data; generate reports, timelines, alerts, graphical user interfaces; detect errors, events, inconsistencies; troubleshoot networks or devices; configure networks or devices; deploy services or devices; reconfigure services, applications, devices, or networks; etc.

While engine 120 is illustrated as a separate entity, other configurations are also contemplated herein. For example, engine 120 can be part of collector 118 and/or a separate entity. Indeed, engine 120 can include one or more devices, applications, modules, databases, processing components, elements, etc. Moreover, collector 118 can represent one or more collectors. For example, in some configurations, collector 118 can include multiple collection systems or entities, which can reside in one or more networks.

Figure 5:
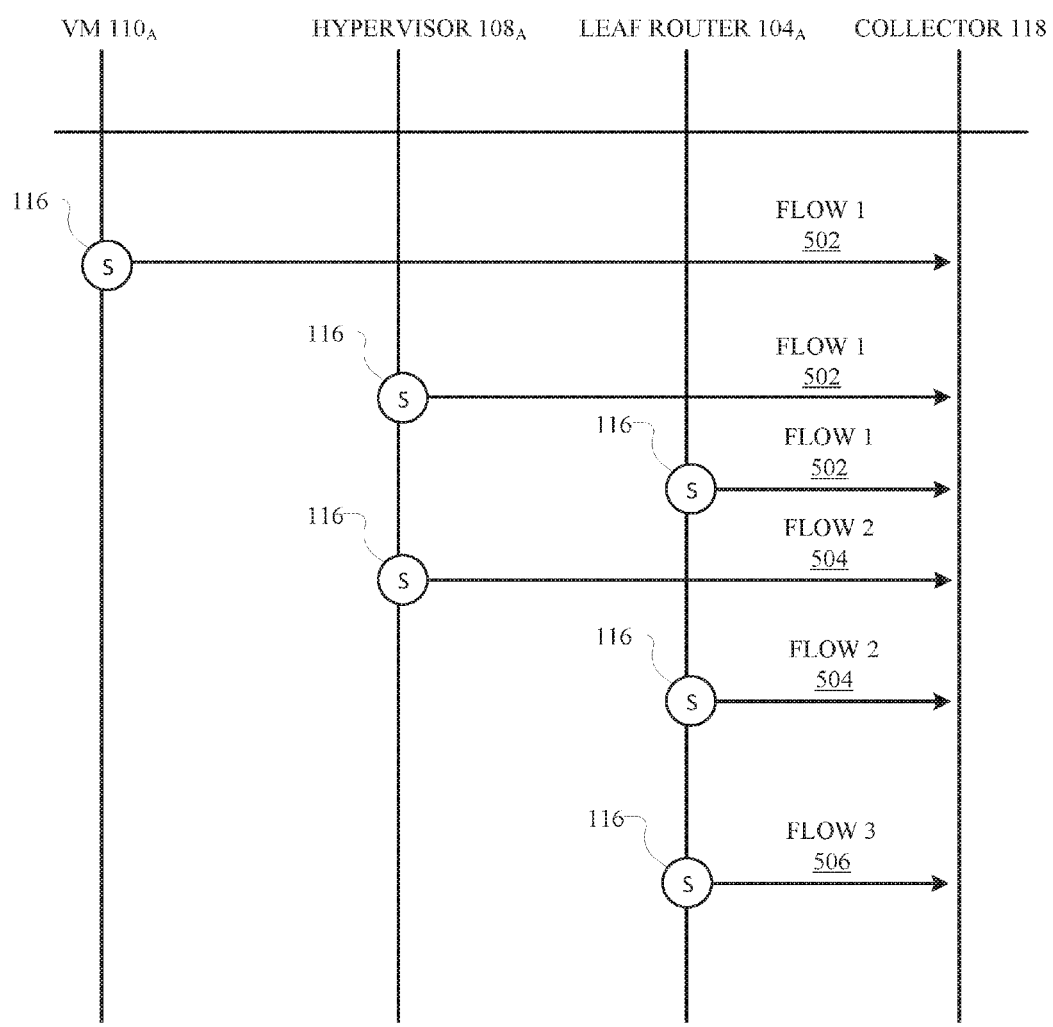
FIG. 5 illustrates a diagram of an example sensor reporting process.

FIG. 5 illustrates a diagram of an example sensor reporting process 500. In this example, flow 1 (502) has been observed (e.g., received, sent, generated, processed) by VM 110$_A$, hypervisor 108$_A$, and leaf router 104$_A$. Flow 2 (504) has been observed by hypervisor 108$_A$ and leaf router 104$_A$. Flow 3 (506) has only been observed by leaf router 104$_A$.

Since flow 1 (502) has been observed by VM 110$_A$, hypervisor 108$_A$, and leaf router 104$_A$, it can be captured and reported to collector 118 by sensors 116 at VM 110$_A$, hypervisor 108$_A$, and leaf router 104$_A$. On the other hand, since flow 2 (504) has been observed by hypervisor 108$_A$ and leaf router 104$_A$, but not VM 110$_A$, it can be captured and reported to collector 118 by sensors 116 at hypervisor 108$_A$ and leaf router 104$_A$, but not VM 110$_A$ Finally, since flow 3 (506) has only been observed by leaf router 104$_A$, it can be captured and reported to collector 118 only by sensor 116 at leaf router 104$_A$.

The reports received by collector 118 can include information identifying the reporting sensor. For example, when transmitting a report to collector 118, each sensor can include a unique sensor identifier, which the collector 118 and/or any other entity reviewing the reports can use to map a received report with the reporting sensor.

Thus, based on the reports from sensors 116, collector 118 and/or a separate entity (e.g., engine 120) can determine that flow 1 (502) was observed and reported by sensors 116 at VM 110$_A$, hypervisor 108$_A$, and leaf router 104$_A$, flow 2 (504) was observed and reported by sensors 116 at hypervisor 108$_A$ and leaf router 104$_A$, and flow 3 (506) was only observed and reported by sensor 116 at leaf router 104$_A$. Based on this information, collector 118 and/or a separate entity, can determine the placement of sensors 116 within VM 110$_A$, hypervisor 108$_A$, and leaf router 104$_A$, as further described below. In other words, this information can allow a device, such as collector 118, to determine which of sensors 116 is located at VM 110$_A$, which is located at hypervisor 108$_A$, and which is located at leaf router 104$_A$. If any of VM 110$_A$, hypervisor 108$_A$, and leaf router 104$_A$ is moved to a different location (e.g., VM 110$_A$ moved to server 106$_C$ and hypervisor 108$_B$), the new flows collected by collector 118 can be used to detect the new placement and topology of VM 110$_A$, hypervisor 108$_A$, and leaf router 104$_A$ and/or their respective sensors.

FIG. 6 illustrates a table of an example mapping 600 of flow reports to sensors. In this example, flow 602 was sent/received by VM 110$_A$, flow 604 was sent/received by hypervisor 108$_A$, and flow 606 was sent/received by leaf router 104$_A$. Accordingly, flow 602 was reported by VM sensor 116, hypervisor sensor 116, and network device sensor 116. Flow 604 was reported by hypervisor sensor 116 and network device sensor 116, but not VM sensor 116. Finally flow 606 was reported by network device sensor 116, but not VM sensor 116 or hypervisor sensor 116.

Figure 7:
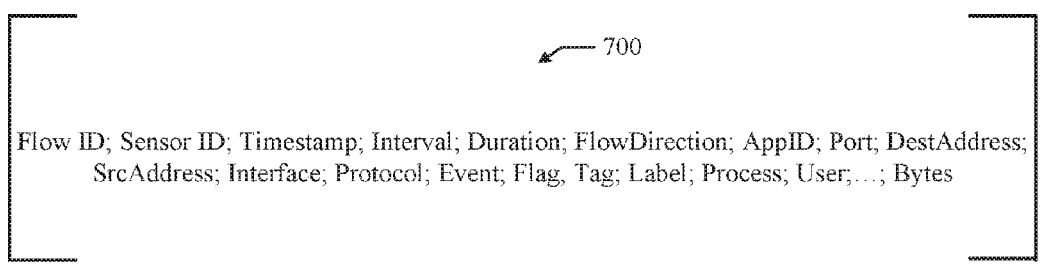
FIG. 7 illustrates a listing of example fields on a sensor report.

FIG. 7 illustrates a listing 700 of example fields on a sensor report. The listing 700 can include one or more fields, such as:

Flow identifier (e.g., unique identifier associated with the flow).

Sensor identifier (e.g., data uniquely identifying reporting sensor).

Timestamp (e.g., time of event, report, etc.).

Interval (e.g., time between current report and previous report, interval between flows or packets, interval between events, etc.).

Duration (e.g., duration of event, duration of communication, duration of flow, duration of report, etc.).

Flow direction (e.g., egress flow, ingress flow, etc.).

Application identifier (e.g., identifier of application associated with flow, process, event, or data).

Port (e.g., source port, destination port, layer 4 port, etc.).

Destination address (e.g., interface address associated with destination, IP address, domain name, network address, hardware address, virtual address, physical address, etc.).

Source address (e.g., interface address associated with source, IP address, domain name, network address, hardware address, virtual address, physical address, etc.).

Interface (e.g., interface address, interface information, etc.).

Protocol (e.g., layer 4 protocol, layer 3 protocol, etc.).

Event (e.g., description of event, event identifier, etc.).

Flag (e.g., layer 3 flag, flag options, etc.).

Tag (e.g., virtual local area network tag, etc.).

Process (e.g., process identifier, etc.).

User (e.g., OS username, etc.).

Bytes (e.g., flow size, packet size, transmission size, etc.).

The listing 700 includes a non-limiting example of fields in a report. Other fields and data items are also contemplated herein, such as handshake information, system information, network address associated with sensor or host, operating system environment information, network data or statistics, process statistics, system statistics, etc. Each of the fields can include data, metadata, and/or any other information relevant to the fields.

Figure 8:
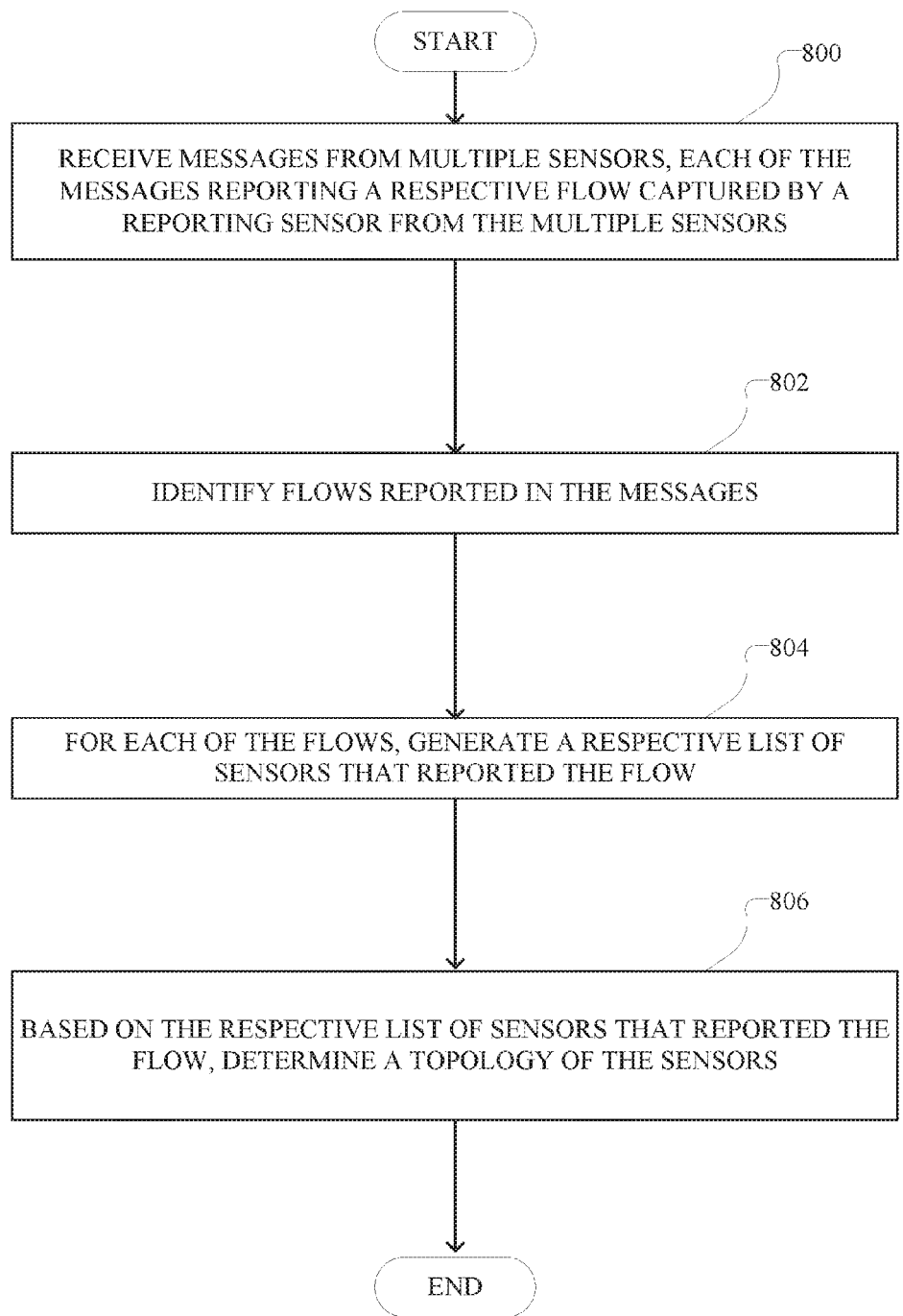
FIG. 8 illustrate an example method embodiment.
Figure 9:
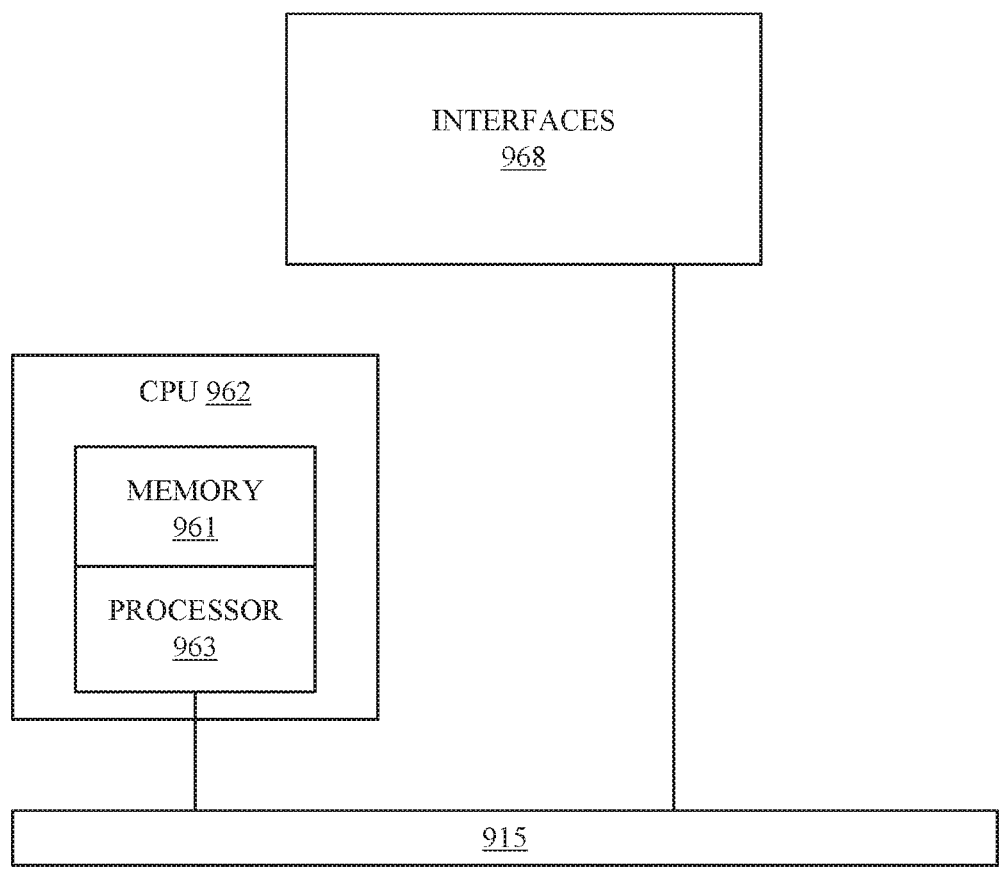
FIG. 9 illustrates an example network device.

Having disclosed some basic system components and concepts, the disclosure now turns to the exemplary method embodiment shown in FIG. 8. For the sake of clarity, the method is described in terms of collector 118, as shown in FIG. 1, configured to practice the method. The steps outlined herein are exemplary and can be implemented in any combination thereof, including combinations that exclude, add, or modify certain steps.

At step 800, collector 118 can receive messages from multiple sensors 116 (e.g., sensors 116 in network environment 100). Each of the messages can report a respective flow captured by a reporting sensor from the multiple sensors 116. For example, the messages can report each flow captured (e.g., observed, sent, received, generated, processed, etc.) at the multiple sensors during a period of time or interval. Each of the messages and/or flows reported in the messages can include a sensor identifier. The sensor identifier can be a unique identifier assigned to a respective sensor. The sensor identifier can thus be used to identify the associated sensor. The sensor identifier can also be used to identify which sensors reported what information (e.g., messages, reports, flows, data, etc.). The messages can also include a flow identifier for each reported flow. The flow identifier can identify the respective flow associated with the flow identifier. The messages can also include other information, such as previously described with reference to FIGS. 1-7.

At step 802, collector 118 can identify the flows reported in the messages. For example, collector 118 can identify each flow reported based on a respective flow identifier. Collector 118 can also, or otherwise, identify each flow reported based on data associated with the flow, such as network address, destination address, source address, timestamp, port, protocol, etc.

At step 804, for each of the flows identified at step 802, collector 118 can generate a respective list of sensors that reported the flow. For example, collector 118 can identify the sensors that reported a specific flow based on sensor identifiers associated with a report of the specific flow or message reporting the flow (e.g., each sensor identifier included in each report of the specific flow). Collector 118 can parse through flows or flow reports to identify a respective sensor identifier in each of the flows or reports in order to determine which sensors reported each flow. For example, as previously mentioned, when reporting a flow, a sensor can associate the flow with a sensor identifier corresponding to that sensor. Thus, collector 118 can analyze, identify, and/or extract a respective sensor identifier associated with each flow reported. Collector 118 can then use the sensor identifier to map sensors to flows reported.

At step 806, collector 118 can determine a topology of the sensors 116 based on the respective list of sensors that reported the flow. For example, collector 118 can determine where the sensors 116 are deployed throughout the network environment 100. Collector 118 can determine if a sensor is deployed in a particular VM, hypervisor, server, or network device (e.g., switch or router). Collector 118 can also determine the relationships between the sensors (e.g., connections, hops, neighbors, egress interface(s), ingress interface(s), sequence(s), communication characteristics, etc.). For example, for any tenant space (e.g., server $106_A$, hypervisor $108_A$, and/or VM $110_A$) in the network environment 100, collector 118 can determine the egress/ingress device and/or sensor (e.g., leaf router $104_A$ and/or network device sensor 116 on leaf router $104_A$), which of the sensors 116 are deployed in the particular tenant space, as well as where each of the sensors 116 deployed in the particular tenant space are deployed (e.g., within server $106_A$, hypervisor $108_A$, and/or VM $110_A$).

If one or more devices, workloads (e.g., VMs and/or hypervisors), and/or sensors are migrated, removed, added, redeployed, reconfigured, etc., collector 118 can perform steps 800-806 to update the topology for any of the sensors 116. Collector 118 and/or any other device can use the topology and placement information to provide context to the reported data, analyze the reported data, visualize the network and/or reported data, generate reports, collect statistics, troubleshoot errors, configure or deploy network devices and applications, monitor the network, calculate and/or monitor quality-of-service details, load balance, detect events and conditions, manage network devices and services, etc. Sensor placement and topology information can also be used for differential analysis in diagnosing missing packets, malware flows, connection errors, security conditions, etc.

Collector 118 can use any knowledge inferred from the sensors and network topology to determine the relationship of the sensors 116. For example, assume that all sensors 116 are configured to send or report information about the network traffic they observe. This information can be sent or reported to collector 118, as previously explained. Each sensor can know the network address (e.g., IP address and port number) used to send information to collector 118. Assume all sensors are configured to periodically send or report information about each and every flow they observe to collector 118. The information reported by each sensor to collector 118 can contain a list of flows that were active during a period of time (e.g., between the current time and the time at which the last information was sent or reported to collector 118). A communication channel between the reporting sensor and collector 118 can also create a flow in every interval or report. Let us denote this flow as control flow ("CF"). The information sent by a sensor can also contain information about the CF, since the CF is also a valid flow in the system.

Let us imagine the following setup for purposes of explanation. First, sensor S1 is deployed in VM $110_A$, which is running inside hypervisor $108_A$. The IP address of VM $110_A$ is IP1. Second, sensor S2 is deployed in the hypervisor $108_A$. Hypervisor $108_A$ has an IP address of IP2, which is different from IP1. Finally, sensor S3 is deployed in or as part of the leaf router $104_A$. The IP address of leaf router $104_A$ is IP3. Leaf router $104_A$ is placed and/or configured such that all network traffic between fabric 112 and hypervisor $108_A$ go through leaf router $104_A$.

Based on above placement of sensors, the following holds true. Flows seen and reported by S1 will also be seen and reported by S2. Flows seen and reported by S2 will also be seen and reported by S3. Thus, flow F1 that is generated inside VM $110_A$ and seen by S1, will be reported by S1, S2, and S3 to collector 118. Moreover, the CF denoting the communication between S1 and collector 118 will be seen and reported by S1, S2, and S3 to collector 118. Flow F2 generated inside hypervisor $108_A$ will be seen and reported by S2 and S3, but not S1. Further, the CF denoting the communication between S2 and collector 118 will be seen and reported by S2 and S3 to collector 118. Flow F3 generated by leaf router $104_A$ will be seen only by leaf router $104_A$ and reported to collector only by F3.

At collector 118, after collecting information from the sensors S1, S2, and S3, we will have the following relationship: F1 will be reported by S1, S2, S3; F2 will be reported by S2 and S3; and F3 will be reported by S3. Accordingly, by determining which of S1, S2, and S3 reported F1, F2, and/or F3, we can determine the relationship of S1, S2, and S3, including placement and topology.

One non-limiting example algorithm or mechanism for determining sensor placement can be as follows.

For each flow reported, obtain a list of which sensors reported the flow. The list can contain sensor identifiers for all sensors that reported the flow.

For every sensor identifier "$S_i$" in the list, generate a tuple with $S_i$ as the first element and the set of all sensors in the list except $S_i$ as the second element. For example, generate the tuple {$S_i$, set of all sensors except $S_i$}. Then, collect all the tuples generated.

Next, obtain a list of all tuples where $S_i$ is the first element. For all the tuples where $S_i$ is the first element, calculate the intersection of the sets that are second element in the tuples. The intersection can represent the "Front Sensors", referring to the list of sensors that can see all flows that sensor $S_i$ can see. In the previous example, for S1, the set of Front Sensors would be {S2, S3}. For S2, the set of Front Sensors would be {S3}, and for S3, the set of Front Sensors would be empty.

Then, calculate the union of the sets that are second element in the tuples where $S_i$ is the first element. Compute the difference between the union set and the intersection set to obtain a "Difference Set." The "Difference Set" can represent the "Rear Sensors", referring to the list of sensors whose flows can be seen by sensor $S_i$. In our previous example, for S1, the set of Rear Sensors would be empty. For S2, the set of Rear Sensors would be {S1}, and for S3, the set of Rear Sensors would be {S1, S2}.

This example algorithm can analyze the flow or flow metadata exported by the sensors 116, and determine the topology of sensors and/or associated hosts/devices, and/or the placement of sensors with relation to each other.

This mechanism for automated determination of placement and topology information avoids the need to manually update sensor placement and topology information. There is also no need to integrate, and have environment specific integration, with hypervisor management software to detect that new VMs have come up or that a VM has moved. Network hardware placement changes can also be tracked automatically. Sensor placement and topology information can also be used for differential analysis in diagnosing missing packets, misconfigurations, malware flows, malware processes, network breaches, routing issues, etc.

Example Devices

FIG. 9 illustrates an example network device 910 according to some embodiments. Network device 910 includes a master central processing unit (CPU) 962, interfaces 968, and a bus 915 (e.g., a PCI bus). When acting under the control of appropriate software or firmware, the CPU 962 is responsible for executing packet management, error detection, and/or routing functions. The CPU 962 preferably accomplishes all these functions under the control of software including an operating system and any appropriate applications software. CPU 962 may include one or more processors 963 such as a processor from the Motorola family of microprocessors or the MIPS family of microprocessors. In an alternative embodiment, processor 963 is specially designed hardware for controlling the operations of router 910. In a specific embodiment, a memory 961 (such as non-volatile RAM and/or ROM) also forms part of CPU 962. However, there are many different ways in which memory could be coupled to the system.

The interfaces 968 are typically provided as interface cards (sometimes referred to as "line cards"). Generally, they control the sending and receiving of data packets over the network and sometimes support other peripherals used with the router 910. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

Although the system shown in FIG. 9 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 961) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 10A and FIG. 10B illustrate example system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates an example computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output device 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that example systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
    receiving, by a computing device, messages from sensors deployed around a network, each of the messages reporting a respective flow captured by a reporting sensor from the sensors;
    identifying flows reported in the messages;
    for each of the flows, generating a respective list of sensors that reported that flow; and
    based on the respective list of sensors, inferring at least one of a respective placement of the sensors within the network and a topology of the sensors.

2. The method of claim 1, wherein the sensors comprise a first sensor, a second sensor, and a third sensor, and wherein the sensors are respectively deployed in one of a virtual machine, a hypervisor hosting the virtual machine, or a network device configured to route traffic associated with the hypervisor, and wherein the inferring step comprises determining that the first sensor is deployed in the virtual machine, the second sensor is deployed in the hypervisor, and the third sensor is deployed in the network device.

3. The method of claim 2, wherein the determining is based on:
    a first determination that a first flow was reported by the first sensor, the second sensor, and the third sensor; and
    a second determination that a second flow was not reported by the first sensor.

4. The method of claim 3, wherein the determining is further based on a third determination that a third flow was only reported by the third sensor.

5. The method of claim 1, wherein each of the messages comprises a sensor identifier associated with the respective flow, and wherein generating the list is based on the sensor identifier associated with each respective flow.

6. The method of claim 1, wherein each of the sensors is deployed at a respective hop within a network path, and wherein each of the sensors is configured to report, to the computing device, each flow observed at the respective hop.

7. The method of claim 6, wherein the network path comprises a plurality of hops, the plurality of hops comprising a virtual machine, a hypervisor hosting the virtual machine, and a network device configured to route traffic associated with the hypervisor.

8. The method of claim 7, wherein the plurality of hops further comprises a server hosting the hypervisor and virtual machine.

9. The method of claim 7, wherein the inferring step comprises determining which of the sensors is deployed at the virtual machine, which of the sensors is deployed at the hypervisor, and which of the sensors is deployed at the network device.

10. The method of claim 1, wherein each message comprises a list of one or more network flows captured and reported by a respective sensor.

11. The method of claim 1, wherein the generating and inferring steps comprise:
generating a plurality of respective lists of sensors for the flows, each of the plurality of respective lists of sensors identifying one or more respective sensors reporting a respective one of the flows;
for each specific sensor in each respective list of sensors from the plurality of respective lists of sensors:
identifying a respective set of other listed sensors comprising all sensors in the respective list of sensors excluding the specific sensor;
generating a list of respective sets of other listed sensors, the list of respective sets comprising each respective set of other listed sensors identified for the specific sensor;
determining a respective union of sensors in the list of respective sets;
determining a respective intersection of sensors in the list of respective sets;
computing a respective difference between the respective union and the respective intersection;
identifying one or more front sensors corresponding to the respective intersection of sensors, the one or more front sensors comprising a first set of all sensors that can observe all flows from the specific sensor; and
identifying one or more rear sensors corresponding to the respective difference, the one or more rear sensors comprising a second set of all sensors whose flows can also be observed by the specific sensor.

12. The method of claim 11, wherein inferring the at least one of the respective placement of the sensors within the network and the topology of the sensors is based on the one or more rear sensors and one or more front sensors identified for each specific sensor.

13. The method of claim 11, further comprising:
when the respective intersection contains multiple sensors and the respective difference is zero or empty, determining that the specific sensor is deployed on a virtual machine;
when the respective intersection contains one sensor and the respective difference is a different sensor, determining that the specific sensor is deployed on a hypervisor hosting the virtual machine; and
when the respective intersection contains zero sensors and the respective difference is zero, determining that the specific sensor is deployed on a network device configured to route traffic associated with the hypervisor.

14. The method of claim 1, wherein:
at least one of the sensors comprises at least one of a first process, a first kernel module, or a first kernel driver on a guest operating system installed on a virtual machine;
at least one sensor comprises at least one of a second process, a second kernel module, or a second kernel driver on a host operating system installed at a hypervisor layer; and
at least one sensor comprises at least one of a third process or a software agent running on a network device.

15. A system comprising:
a processor; and
a computer-readable storage medium having stored therein instructions which, when executed by the processor, cause the processor to perform operations comprising:
receiving messages from sensors deployed around a network, each of the messages reporting a respective flow captured by a reporting sensor from the sensors;
identifying flows reported in the messages;
for each of the flows, generating a respective list of sensors that reported that flow; and
based on the respective list of sensors, inferring at least one of a respective placement of the sensors within the network and a topology of the sensors.

16. The system of claim 15, wherein the generating and inferring steps comprise:
generating a plurality of respective lists of sensors for the flows, each of the plurality of respective lists of sensors identifying one or more respective sensors reporting an associated flow;
for each specific sensor in each respective list of sensors from the plurality of respective lists of sensors, identifying a respective set of other listed sensors comprising all sensors in the respective list of sensors excluding the specific sensor;
for each specific sensor, generating a list of respective sets of other listed sensors, the list of respective sets comprising each respective set of other listed sensors identified for the specific sensor;
for each specific sensor:
determining a respective union of sensors in the list of respective sets;
determining a respective intersection of sensors in the list of respective sets;
computing a respective difference between the respective union and the respective intersection;
identifying one or more front sensors corresponding to the respective intersection of sensors, the one or more front sensors comprising a first set of all sensors that can observe all flows from the specific sensor; and
identifying one or more rear sensors corresponding to the respective difference, the one or more rear sensors comprising a second set of all sensors whose flows can also be observed by the specific sensor.

17. The system of claim 16, wherein inferring the at least one of the respective placement of the sensors within the network and the topology of the sensors is based on the one or more rear sensors and one or more front sensors identified for each specific sensor.

18. The system of claim 17, wherein the sensors comprise a first sensor, a second sensor, and a third sensor, and wherein the sensors are respectively deployed in one of a virtual machine, a hypervisor hosting the virtual machine, or a network device configured to route traffic associated with the hypervisor, and wherein the inferring the at least one of the respective placement of the sensors within the network and the topology of the sensors comprises determining that the first sensor is deployed in the virtual machine, the second sensor is deployed in the hypervisor, and the third sensor is deployed in the network device.

19. The system of claim 15, wherein each of the sensors is deployed at a respective hop within a network path, and wherein each of the sensors is configured to report, to the system, each flow observed at the respective hop, wherein the network path comprises a plurality of hops, the plurality of hops comprising a virtual machine, a hypervisor hosting the virtual machine, and a network device configured to route traffic associated with the hypervisor.

20. A non-transitory computer-readable storage medium having stored therein instructions which, when executed by a processor, cause the processor to perform operations comprising:
  receiving, by a computing device, messages from sensors deployed around a network, each of the messages reporting a respective flow captured by a reporting sensor from the sensors;
  identifying flows reported in the messages;
  generating a plurality of respective lists of sensors for the flows, each of the plurality of respective lists of sensors identifying one or more respective sensors reporting a respective one of the flows; and
  based on the plurality of respective lists of sensors, inferring at least one of a respective placement of the sensors within the network and a topology of the sensors by:
    for each specific sensor in each respective list of sensors from the plurality of respective lists of sensors:
      identifying a respective set of other listed sensors comprising all sensors in the respective list of sensors excluding the specific sensor;
      generating a list of respective sets of other listed sensors, the list of respective sets comprising each respective set of other listed sensors identified for the specific sensor;
      determining a respective union of sensors in the list of respective sets;
      determining a respective intersection of sensors in the list of respective sets;
      computing a respective difference between the respective union and the respective intersection;
      identifying one or more front sensors corresponding to the respective intersection of sensors, the one or more front sensors comprising a first set of all sensors that can observe all flows from the specific sensor; and
      identifying one or more rear sensors corresponding to the respective difference, the one or more rear sensors comprising a second set of all sensors whose flows can also be observed by the specific sensor.

* * * * *